(12) United States Patent
Li et al.

(10) Patent No.: US 6,269,245 B1
(45) Date of Patent: Jul. 31, 2001

(54) CELLULAR COMMUNICATION SYSTEM EMPLOYING DYNAMIC PREFERENTIAL CHANNEL ALLOCATION

(75) Inventors: Kuang-Yu Li, Glendale; Jeffrey E. Outwater, Agoura Hills; William F. Courtney, Long Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/150,801

(22) Filed: Sep. 10, 1998

(51) Int. Cl.[7] .................................................. H04Q 7/20
(52) U.S. Cl. .......................... 455/450; 455/427; 455/452; 455/428; 455/447
(58) Field of Search ..................................... 455/450, 427, 455/447, 452, 453, 63, 509, 512, 62, 428; 379/59, 58, 18; 370/321, 229, 230

(56) References Cited

U.S. PATENT DOCUMENTS

| | | | |
|---|---|---|---|
| 5,448,621 | * 9/1995 | Knudsen | 379/58 |
| 5,732,353 | * 3/1998 | Haartsen | 455/450 |
| 5,826,189 | * 10/1998 | Thapa et al. | 455/428 |
| 5,898,681 | * 4/1999 | Dutta | 370/229 |
| 5,926,762 | * 7/1999 | Arpee et al. | 455/447 |
| 5,974,324 | * 10/1998 | Henson | 455/447 |

* cited by examiner

Primary Examiner—Daniel Hunter
Assistant Examiner—Lana Le
(74) Attorney, Agent, or Firm—V. D. Duraiswamy; M. W. Sales

(57) ABSTRACT

An earth orbiting satellite communicates with ground-based communication terminals via a limited number of frequency channels. To maximize the amount of concurrent communication that can be accommodated, the satellite's effective service area is partitioned into cells. The position of each cell relative to nearby cells is established in support of a scheme to maximize channel reutilization. Based on knowledge of communication demand and inter-cell interference constraints, all available channels are associated with particular groups of cells having a common relative position. This establishes a preference for assigning channels to particular cell groups. As communication demand in the cells fluctuates and additional communication channels are required, the channel assignment preferences are consulted to determine which channels to assign to the requesting cells.

13 Claims, 17 Drawing Sheets

| ID | Type | | ID | Demand |
|----|------|---|----|--------|
| 44 | f | | 44 | 3 |
| 45 | g | | 45 | 5 |
| 46 | a | | 46 | 4 |
| 53 | a | | 53 | 7 |
| 54 | b | | 54 | 6 |
| 55 | c | | 55 | 6 |
| 56 | d | | 56 | 5 |
| 63 | c | | 63 | 7 |
| 64 | d | | 64 | 8 |
| 65 | e | | 65 | 8 |
| 66 | f | | 66 | 4 |
| 67 | g | | 67 | 6 |
| 73 | f | | 73 | 3 |
| 74 | g | | 74 | 3 |
| 75 | a | | 75 | 5 |
| 76 | b | | 76 | 3 |
| 84 | b | | 84 | 4 |
| 85 | c | | 85 | 6 |
| 86 | d | | 86 | 4 |

| Pool 1 |||||||||
|---|---|---|---|---|---|---|---|---|
| Sub Pool | | Member |||||||
| | | 1 | 2 | 3 | 4 | | | n |
| a | Chan No. | 1 | 8 | | | | | | 265A
| | Qty Avail. | | | | | | | |
| b | Chan No. | 2 | 9 | | | | | | 265B
| | Qty Avail. | | | | | | | |
| c | Chan No. | 3 | 10 | | | | | | 265C
| | Qty Avail. | | | | | | | |
| d | Chan No. | 4 | 11 | | | | | | 265D
| | Qty Avail. | | | | | | | |
| e | Chan No. | 5 | 12 | | | | | | 265E
| | Qty Avail. | | | | | | | |
| f | Chan No. | 6 | 13 | | | | | | 265F
| | Qty Avail. | | | | | | | |
| g | Chan No. | 7 | 14 | | | | | | 265G
| | Qty Avail. | | | | | | | |
| k | Chan No. | | | | | | | | 265K
| | Qty Avail. | | | | | | | |

FIG. 13

| Pool 2 | | | | | | | | |
|---|---|---|---|---|---|---|---|---|
| Sub Pool | | Member | | | | | | |
| | | 1 | 2 | 3 | 4 | | $m_k-n$ | |
| a | Chan No. | 15 | 22 | 29 | 34 | | | 275A |
| | Qty Avail. | | | | | | | |
| b | Chan No. | 16 | 23 | 30 | | | | 275B |
| | Qty Avail. | | | | | | | |
| c | Chan No. | 17 | 24 | 31 | 35 | | | 275C |
| | Qty Avail. | | | | | | | |
| d | Chan No. | 18 | 25 | 32 | 36 | | | 275D |
| | Qty Avail. | | | | | | | |
| e | Chan No. | 19 | 26 | 33 | | | | 275E |
| | Qty Avail. | | | | | | | |
| f | Chan No. | 20 | 27 | | | | | 275F |
| | Qty Avail. | | | | | | | |
| g | Chan No. | 21 | 28 | | | | | 275G |
| | Qty Avail. | | | | | | | |
| k | Chan No. | | | | | | | 275K |
| | Qty Avail. | | | | | | | |

| | Available Channels | | | | | | | | | | $S_i$ | $W_i$ |
|---|---|---|---|---|---|---|---|---|---|---|---|---|
| | $f_1$ | $f_2$ | $f_3$ | $f_4$ | $f_5$ | $f_6$ | $f_7$ | $f_8$ | | $f_n$ | | |
| NB[1] | 0 | 1 | 0 | 0 | 1 | 0 | 1 | 0 | | 0 | | |
| NB[2] | 0 | 0 | 1 | 0 | 1 | 0 | 0 | 1 | | 0 | | |
| NB[3] | 0 | 1 | 0 | 0 | 0 | 0 | 0 | 0 | | 0 | | |
| NB[4] | 0 | 0 | 0 | 0 | 0 | 1 | 0 | 1 | | 0 | | |
| NB[5] | 0 | 0 | 0 | 1 | 0 | 0 | 0 | 0 | | 0 | | |
| NB[6] | 1 | 0 | 0 | 0 | 0 | 0 | 0 | 0 | | 0 | | |
| NB[7] | 0 | 0 | 0 | 0 | 0 | 0 | 1 | 0 | | 0 | | |
| NB[8] | 0 | 1 | 1 | 0 | 1 | 0 | 0 | 0 | | 0 | | |
| NB[9] | 0 | 1 | 0 | 0 | 0 | 0 | 1 | 0 | | 0 | | |
| NB[10] | 0 | 0 | 0 | 1 | 1 | 0 | 0 | 0 | | 0 | | |
| NB[11] | 0 | 0 | 0 | 0 | 0 | 1 | 0 | 1 | | 0 | | |
| NB[12] | 0 | 0 | 0 | 0 | 0 | 1 | 0 | 0 | | 0 | | |
| NB[13] | 0 | 0 | 1 | 0 | 0 | 0 | 0 | 0 | | 0 | | |
| NB[14] | 0 | 0 | 0 | 1 | 0 | 0 | 0 | 0 | | 0 | | |
| NB[15] | 1 | 0 | 0 | 0 | 0 | 0 | 0 | 0 | | 0 | | |
| NB[16] | 1 | 1 | 0 | 0 | 0 | 0 | 0 | 0 | | 0 | | |
| NB[17] | 0 | 0 | 0 | 0 | 0 | 0 | 1 | 0 | | 0 | | |
| NB[18] | 1 | 0 | 0 | 0 | 1 | 0 | 1 | 1 | | 0 | | |

FIG. 17

CELLULAR COMMUNICATION SYSTEM EMPLOYING DYNAMIC PREFERENTIAL CHANNEL ALLOCATION

BACKGROUND OF THE INVENTION

1. Field of the Invention

The present invention is a novel method for selecting communication frequencies that will be used in the geographic regions in cellular communication systems.

2. Description of the Related Art

Communication systems that service wide areas are limited by the availability of radio frequencies. Given the practical constraints associated with the construction of radio equipment, a communication system is normally tailored to operate within a given range of radio frequencies. The range of radio frequencies that can be utilized is usually further constrained by international treaties and national laws that govern allocation of the frequency spectrum in general. A communication system must select a frequency range that can be accommodated by the radio equipment and satisfies the non-technical limitations. This frequency range is then partitioned into a limited number of communication channels. To obtain a capacity above the channel limit, an attempt must be made to reuse the channels.

Cellular communication systems are good examples of how a limited number of communication channels can be used again and again. The service area of a cellular communication system is partitioned into a plurality of geographic regions called cells. As the need for communication capacity increases, a single channel can be used in several different cells at one time. Channel reuse in cellular systems is still limited by factors such as inter-cell interference and equipment limitations.

Allocating the limited number of channels available in a cellular system to the various cells poses a challenge to frequency reutilization. The ultimate goal is to provide communication service within each cell, regardless of how many channels are demanded in each cell. Communication services are provided when a user terminal calls another user terminal. When a cell requires an additional channel for communication but there are no channels available, that call is said to be blocked. Every call that is blocked due is to the lack of an available communication channel results in lost revenue to the service provider.

Imprudent channel allocations can cause the call blocking rate to escalate. A cellular communication system based on a judicious method for allocating channels significantly reduces the call blocking rate over traditional channel allocation methods. Each additional call that can be completed as a result of the channel allocation strategy results in additional revenue to the service provider.

Two methods have previously been used to allocate channels to cells. The first method employs a fully static allocation, and the second a fully dynamic allocation. The fully dynamic method is known as the "Greedy Algorithm". Marginal performance improvements have been attached for fully dynamic allocation. However, each of these prior methods has significant limitations.

Cellular channel allocation using static allocation relies on the anticipated amount of communication demand in each cell in the system. Communication channels are allocated to the cells during system initialization based on the predicted demand. This most traditional method fails when any particular cell requires capacity greater than the original prediction. Once the predicted capacity in a cell is. exceeded, call blocking occurs immediately and causes lost revenue.

Fully dynamic allocation would seemingly provide virtually limitless capacity to a given cell, but this is not the case. Fully dynamic allocation allocates communication channels to the various cells as the demand for communication varies over time, but channels are allocated in a completely random fashion. A problem with this technique is a lack of foresight with which channels are allocated. As the system operates, channels are allocated to cells in anarchical fashion. When cells require additional channels, other restrictions, including channel reutilization constraints and inter-cell interference, can preclude subsequent channel assignments. This can result in blocked calls and lost revenue.

The limitations associated with fully dynamic allocation led to a recognition that, when all available channels were grouped together for allocation to the cells in the system, the assignment of a channel to a cell could occur when the channel was not used by cells located within a prescribed reuse zone. While refining the Greedy Algorithm, a technique was developed called the usefulness factor. This technique measured the likelihood that a channel would later be needed by a cell's neighbors.

SUMMARY OF THE INVENTION

The present invention comprises a system that addresses the need to reduce and minimize call blocking rates in cellular communication systems. The system is organized into a number of communication regions on the earth's surface, called cells, that collectively form a service area. An earth orbiting satellite services communication terminals located in the cells by using a limited number of communication channels. On board the satellite, a transponder relays communication traffic from one cell to the other while a beam forming unit enables a phased array antenna to establish a plurality of radio frequency beams. Each of these beams falls incident on a spatially distinct cell on the earth's surface. The satellite includes a ground interface unit that receives channels assignments. The channel assignments, which are managed by a channel allocation unit located at a ground control terminal, dictate which channels are to be used in the cells within the service area. The assignments are based on a preferential channel list for each cell in the service area. The preferential channel list is itself based on the spatial relationship of the cells and is structured to reduce blocked calls and minimizes inter-cell interference.

The preferential channel order acknowledges that communication demand with the system's service area exhibits three distinct profiles. The first profile represents the base demand for communication channels common to all cells in the service area. The second demand profile defines the amount of communication demand each cell will require above and beyond to base demand. This is called the maximum demand. In cellular telephone systems, this corresponds to the total number of subscribers that are likely to use the system simultaneously. Both the base and maximum demand profiles can be generally predicted and then used to fashion a preferential order for channel assignments for each cell.

The final demand profile is experienced by the system during anomalous conditions that cause the demand in some cells to exceed the maximum capacity and demand in other cells to fall well below the base demand that would ordinarily be expected. In cellular telephone systems, this can occur when special events like county fairs or parades draw large numbers of subscribers to congregate into just a few cells.

As the demand for communication capacity within a cell fluctuates, the satellite requests channels from the channel allocation unit located on the ground. The channel allocation unit dynamically refers to the preferential channel list for each cell as it selects a communication channel and assigns that channel to the requesting cell. The channel allocation unit follows some basic rules that constrain the channel selection process. These channel selection constraints include factors that represent the radiation pattern of the antenna (called the reuse zone), neighbor constraints that account for which channels are likely to be used or currently in use by the cell's neighbors and regulatory restrictions that preclude the use of some frequencies in certain geographic regions.

Since the preferential channel list is based on three demand profiles, the fluctuating demand over time is more easily accommodated. By applying the channel constraints to the preferential channel list each time a channel is selected, the call blocking rate is reduced further.

DESCRIPTION OF THE DRAWINGS

These and other features, aspects, and advantages of the present invention will be apparent to those skilled in the art from the following detailed description, together with the accompanying drawings in which:

FIG. 13 presents the structure of the first of three pools used to accommodate base demand, maximum demand and anomalous events;

FIG. 14 presents the structure of the second of three pools used to accommodate base demand, maximum demand and anomalous events;

FIG. 17 presents the structure of a table used to calculate the weighted usefulness factor.

DETAILED DESCRIPTION OF THE INVENTION

Figure 1:
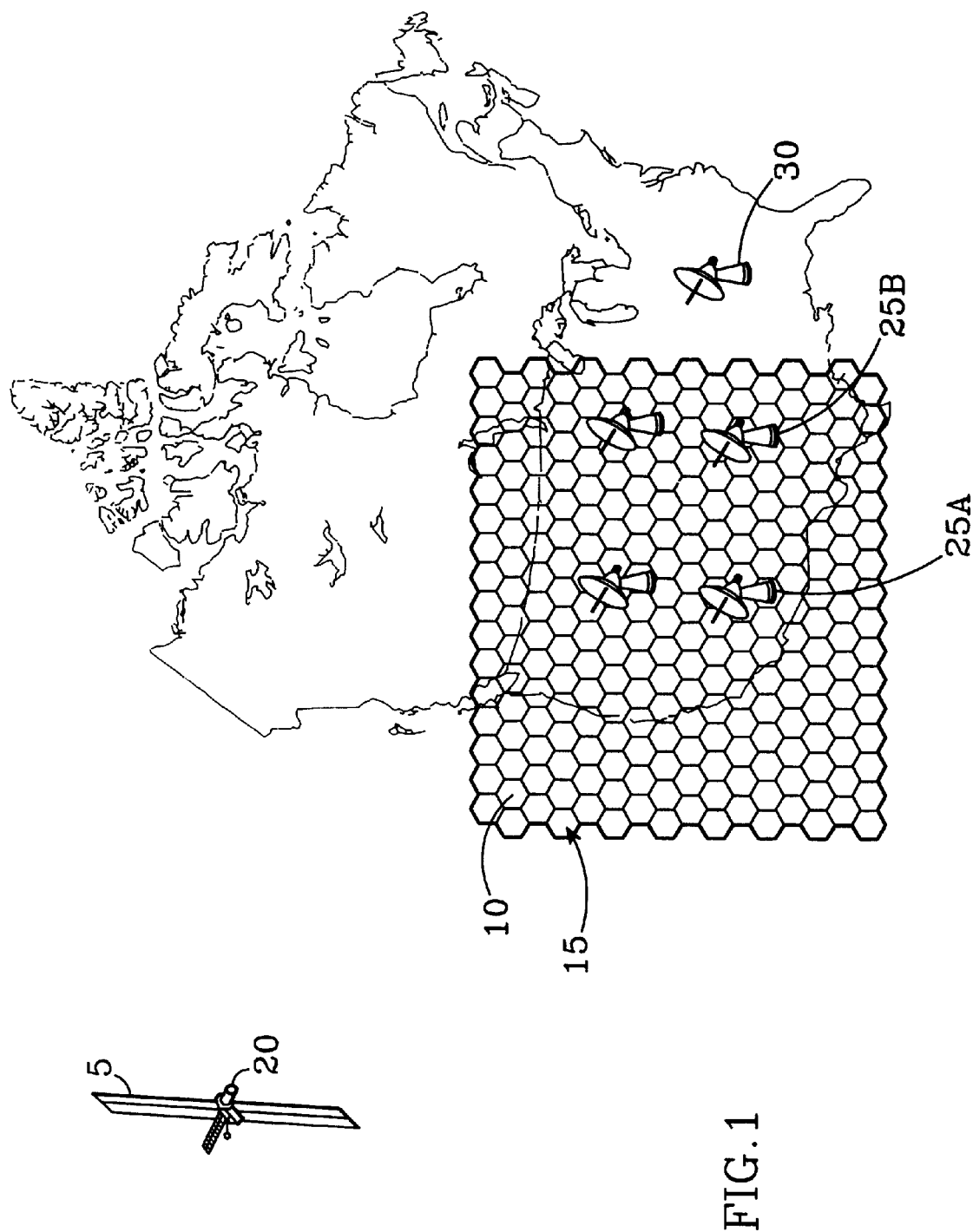
FIG. 1 is an pictorial view that illustrates the use of the new communication system for a service area.

FIG. 1 depicts the present concept for a communication system, including an earth orbiting satellite 5, a plurality of communication regions on the earth's surface called cells 10, a plurality of communication terminals 25 distributed among the cells, and a ground control terminal 30. The cells collectively form a service area 15. Satellite 5 includes a beam forming unit 45 that enables phased antenna array 20 to form separate beams of radio frequency energy for each cell in the service area. The communication terminals 25, which are randomly distributed throughout the service area, allow users of the system to transmit information to and receive information from satellite 5. Satellite 5 communicates with communication terminals 25 over assigned radio frequency channels. A ground control terminal 30, which may or may not be located within the service area, provides a means to control satellite 5 and includes channel allocation unit 40. Channel allocation unit 40 is shown on the ground but it may also be included up in earth orbiting satellite 5.

Figure 2:
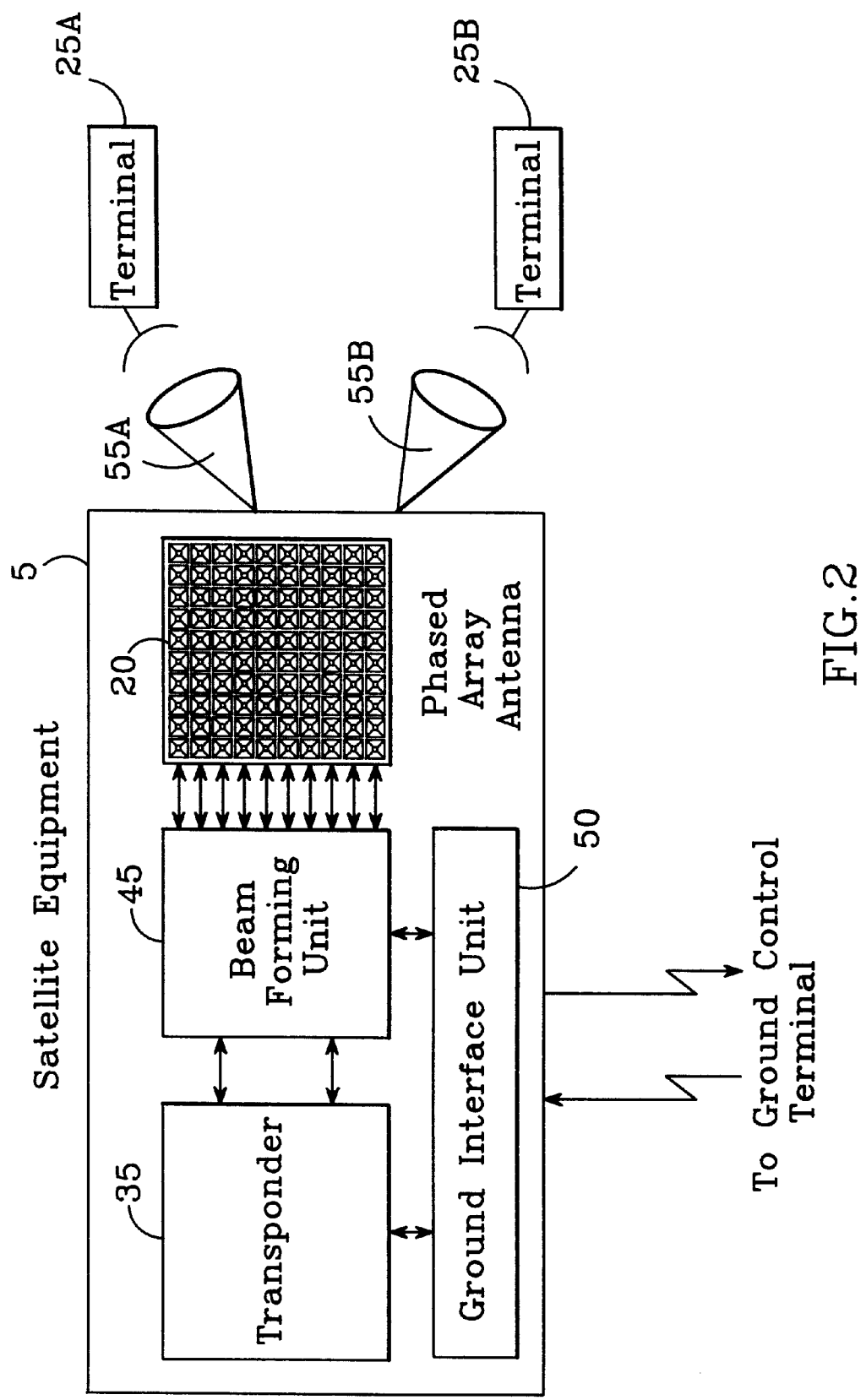
FIG. 2 is a block diagram of satellite equipment used to communicate with communication terminals.

FIG. 2 illustrates the compliment of equipment contained in satellite 5 necessary to provide communication service to communication terminals 25. This includes transponder 35, beam forming unit 45, phased array antenna 20, and ground interface unit 50.

Transponder 35 comprises a plurality of transceivers. The number of transceivers provided by transponder 35 determines the number of simultaneous users that can be present in a single cell. Transponder 35 communicates with beam forming unit 45. Beam forming unit 45 induces phase and amplitude perturbations into the signal it receives from transponder 35. These phase and amplitude perturbations, which are based on coefficients received from the ground via ground interface unit 50, enable phased antenna array 20 to form separate directional beams 55 for each cell in the service area. Each of said beams is aimed at a corresponding cell in the service area.

Communication terminals 25A and 25B can be cellular telephones within the service area that can migrate from one cell to the next. Whenever a communication terminal is operating in service area 15, it sends registration messages to satellite 5. These registration messages are processed by transponder 35 in order to ascertain the whereabouts of each active communication terminal in the system.

Suppose the user of communication terminal 25A wants to make a phone call to a person using communication terminal 25B. In order to initiate the phone call, the first user depresses a "send" key on the communication terminal. When the "send" key is depressed, communication terminal 25A sends a message to satellite 5 requesting that the system establish a communication link with communication terminal 25B. This is called a call request.

On a periodic basis, ground interface unit 50 receives beam forming coefficients from the ground via ground interface unit 50 which cause beam forming unit 45 to steer a beam to the cell where communication terminal 25A is located. At this instance, transponder 35 receives the call request from communication terminal 25A. Transponder 35 then requests channel allocation unit 40, which is located on the ground, to assign a communication channel to the pending call request. Channel allocation unit 40 responds to the channel request by determining which communication channel should be assigned to that channel request and communicating that channel number to transponder 35. Transponder 35 then establishes a communication link with requesting communication terminal 25A using the channel assigned by channel allocation unit 40.

After a communication link is established with requesting communication terminal 25A, transponder 35 determines which cell the recipient communication terminal 25B is located in. Transponder 35 does this by means of the communication terminal registration messages that it processes. These registration messages enable transponder 35 to know the whereabouts of each active communication terminal in the system. Transponder 35 then issues a second channel request to channel allocation unit 40. Channel allocation unit 40 again determines which channel number must be used to communicate with recipient communication terminal 25B and sends that channel number to transponder 35.

Transponder 35 then uses the channel number received from channel allocation unit 40 to communicate with the recipient communication terminal 25B. The beam forming unit 45 uses a second set of coefficients to steer a second beam to the cell that communication terminal 25B is located in. This, then, completes the communication link.

Channel Allocation Unit.

Figure 3:
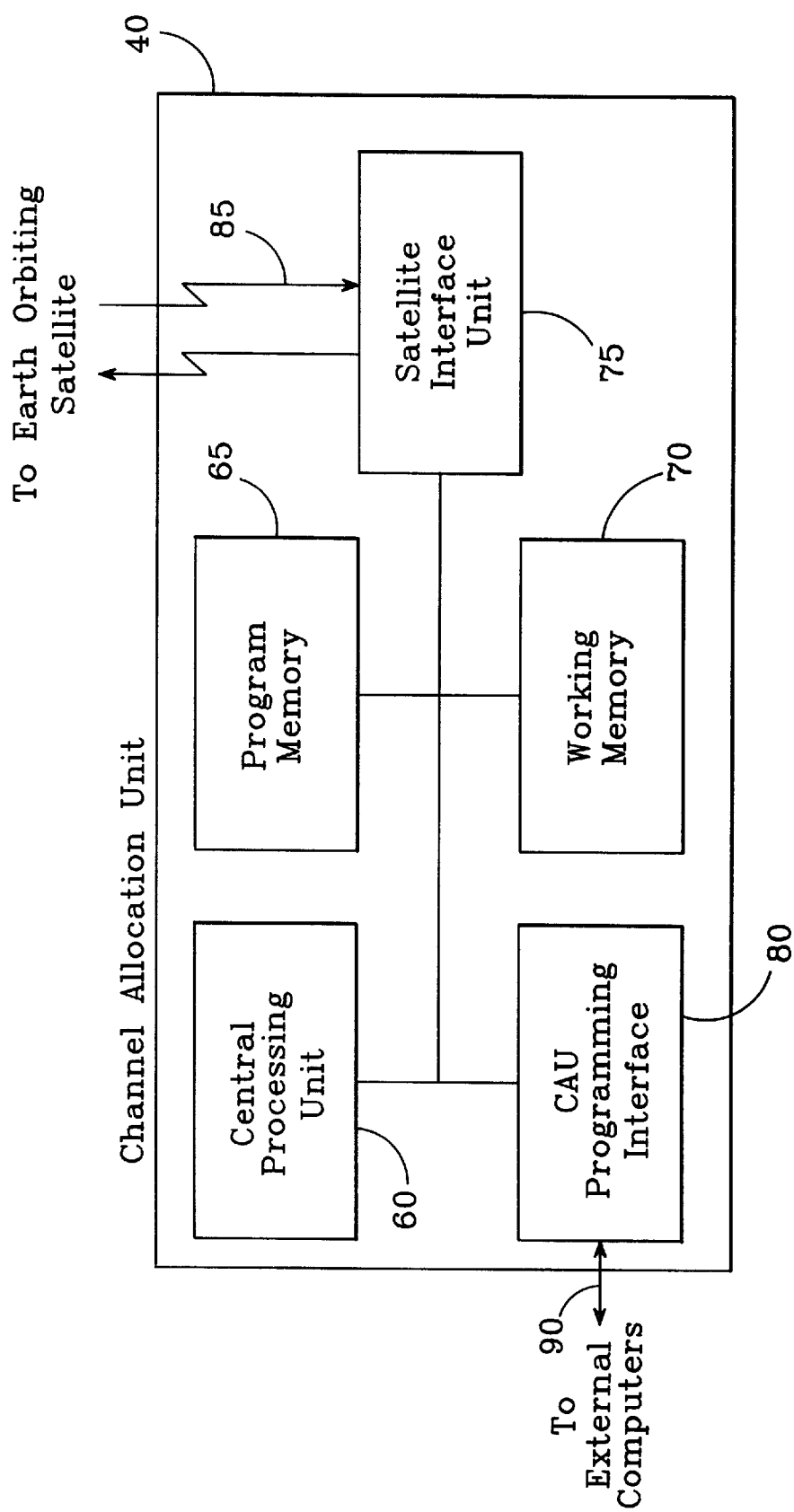
FIG. 3 is a block diagram of the channel allocation unit.

FIG. 3 is a block diagram of the channel allocation unit 40. It preferably consists of a central processing unit 60 which executes instruction sequences stored in a program memory 65, a working memory 70, a satellite interface unit 75 and a programming interface 80. Channel allocation unit 40 communicates with the transponder 35, located on satellite 5, via a radio frequency link 85. Initialization of the Channel allocation unit occurs via programming interface 80. Programming interface 80 can be connected to external computers via local area network 90. Although the interface to the channel allocation unit is depicted as a local area network, any convenient computer interface can be used.

Figure 4:
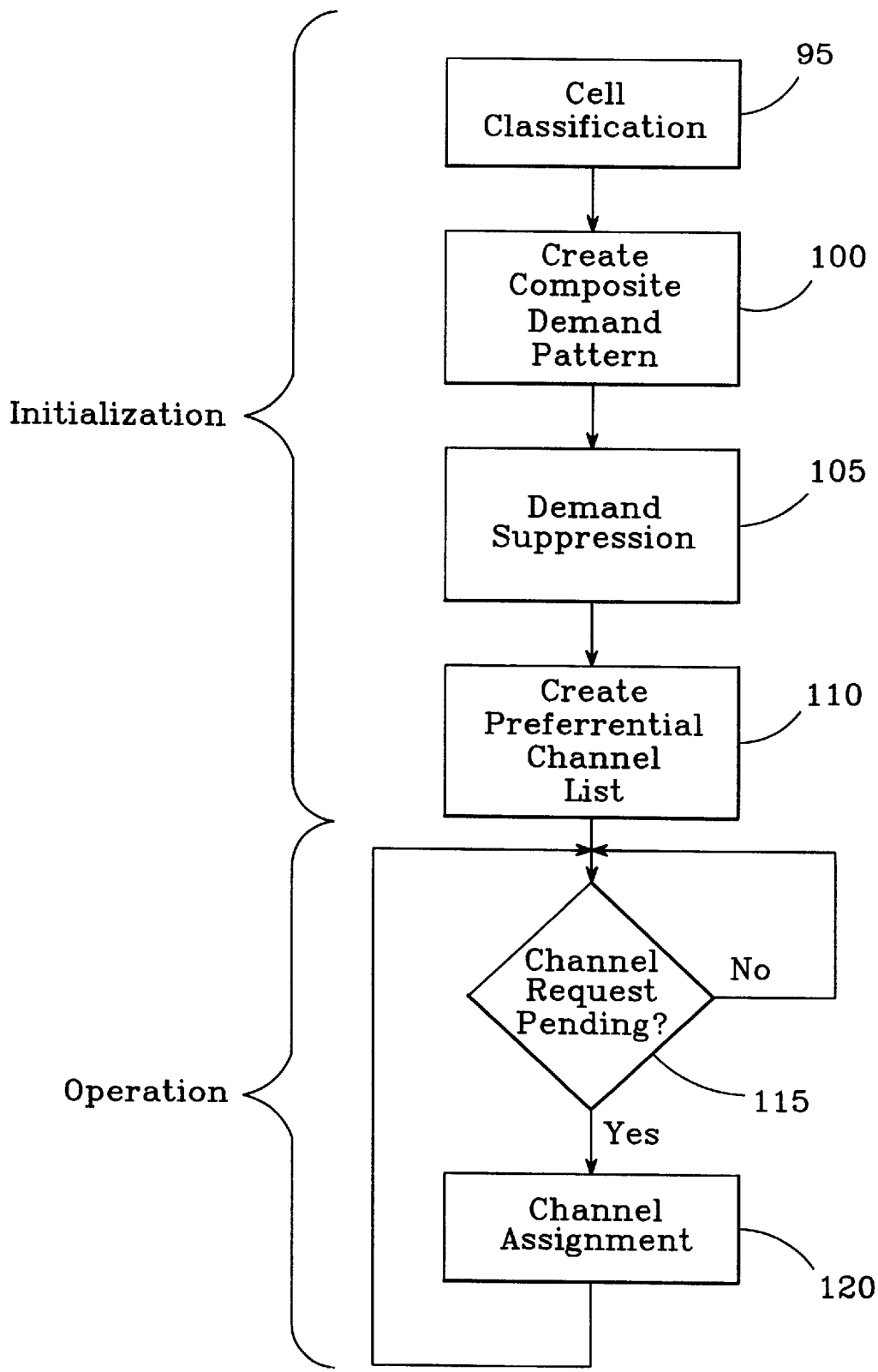
FIG. 4 is a diagram illustrating the sequence of steps performed by the channel allocation unit.

During system initialization, as illustrated in FIG. 4, central processing unit 60 executes four different instruction sequences. These four instruction sequences are: cell classification 95; creation of a composite traffic demand pattern 100; suppression of the demand pattern 105; and creation of a preferential channel list 110. All of these instruction sequences reside in program memory 65. Central processing unit 60 executes instruction sequence 95 to spatially distinguish each cell in a service area 15. After central processing unit 60 has classified each cell in the service area, it executes instruction sequence 100 to determine the number of communication channels each cell in the service area will require when the system is operating. This results in the creation of a composite demand pattern for service area 15. Central processing unit 60 then executes further instruction sequences, sequence 105 and sequence 110, to suppress the actual demand in each cell to a level that can be accommodated by the limited number of communication channels available in the system and then to associate each communication channel in the system with a particular cell type, resulting in a preferred list of channels to be assigned to a particular cell.

After the system has become initialized and as the demand for communication fluctuates, channel allocation unit 40 responds to individual requests as further illustrated in FIG. 4. To do so, central processing unit 60 executes a sequence of instructions stored in program memory 65 to interrogate satellite interface 75 to determine if a channel allocation request is pending. This is accomplished by executing instruction sequence 115. In response to the presence of a pending channel allocation request, central processing unit 60 executes instruction sequence 120 to select a channel from the preferred list of channels for the cell that is making the request and allocates the selected channel to the requesting transceiver bank. The number of the selected channel is communicated to the transponder 35 via satellite interface 75 and it's associated radio link 85.

Cell Classification.

Figure 5:
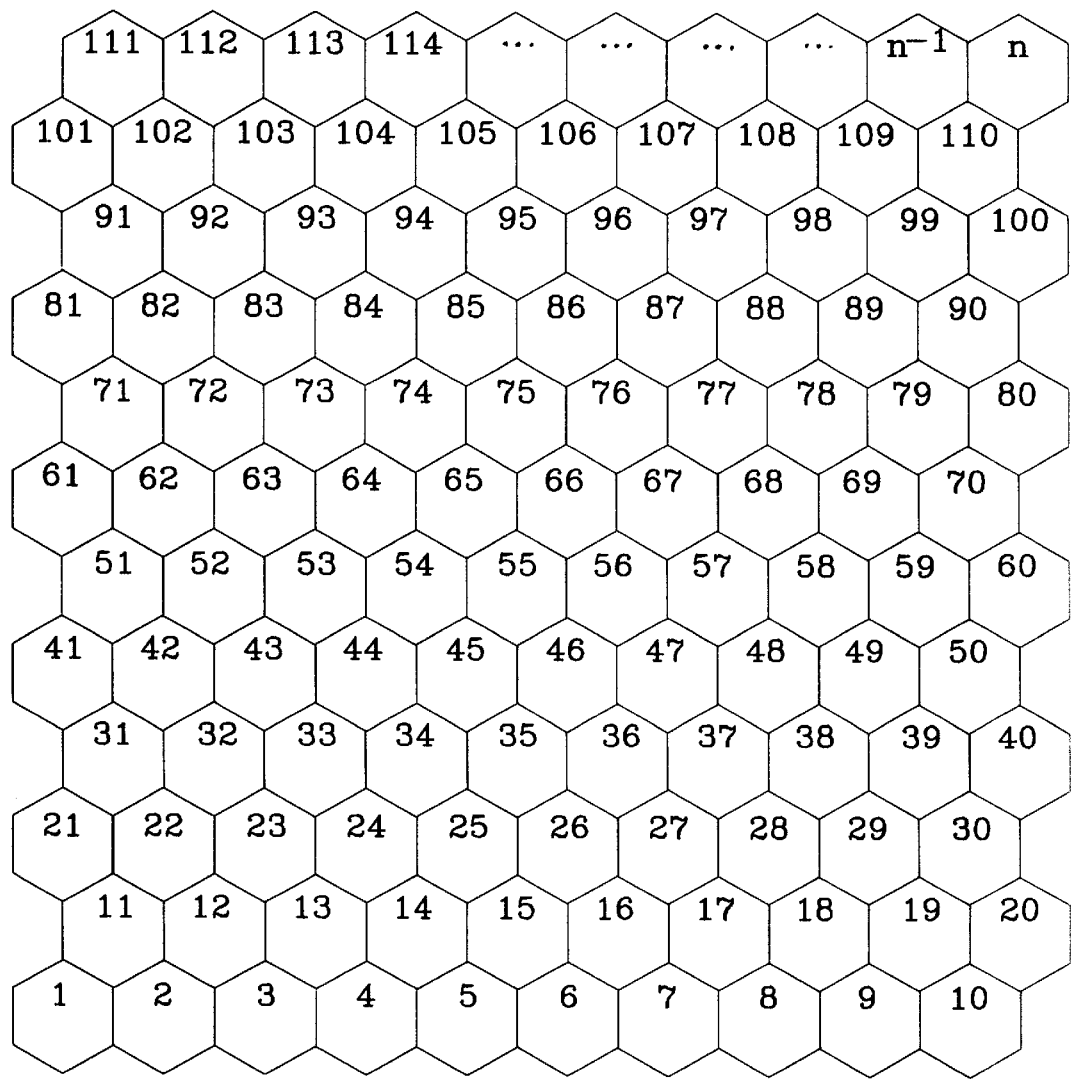
FIG. 5 is a diagram that illustrates how different cells within a service area may be distinguished from each other.

In order to classify each cell in a service area comprising "n" cells, central processing unit 60 establishes a numeric identifier for each cell in the service area. FIG. 5 illustrates how the cells may be identified by a number beginning with No. 1 through No. "n–1" and finally No. "n", inclusive. For simplicity, each cell is illustrated as a hexagon in a honeycomb pattern with the other cells. Although, in reality, the cells on the earth's surface will vary in shape, being more rounded with varying degrees of overlap with or spacing from the other adjacent cells.

Figure 6:
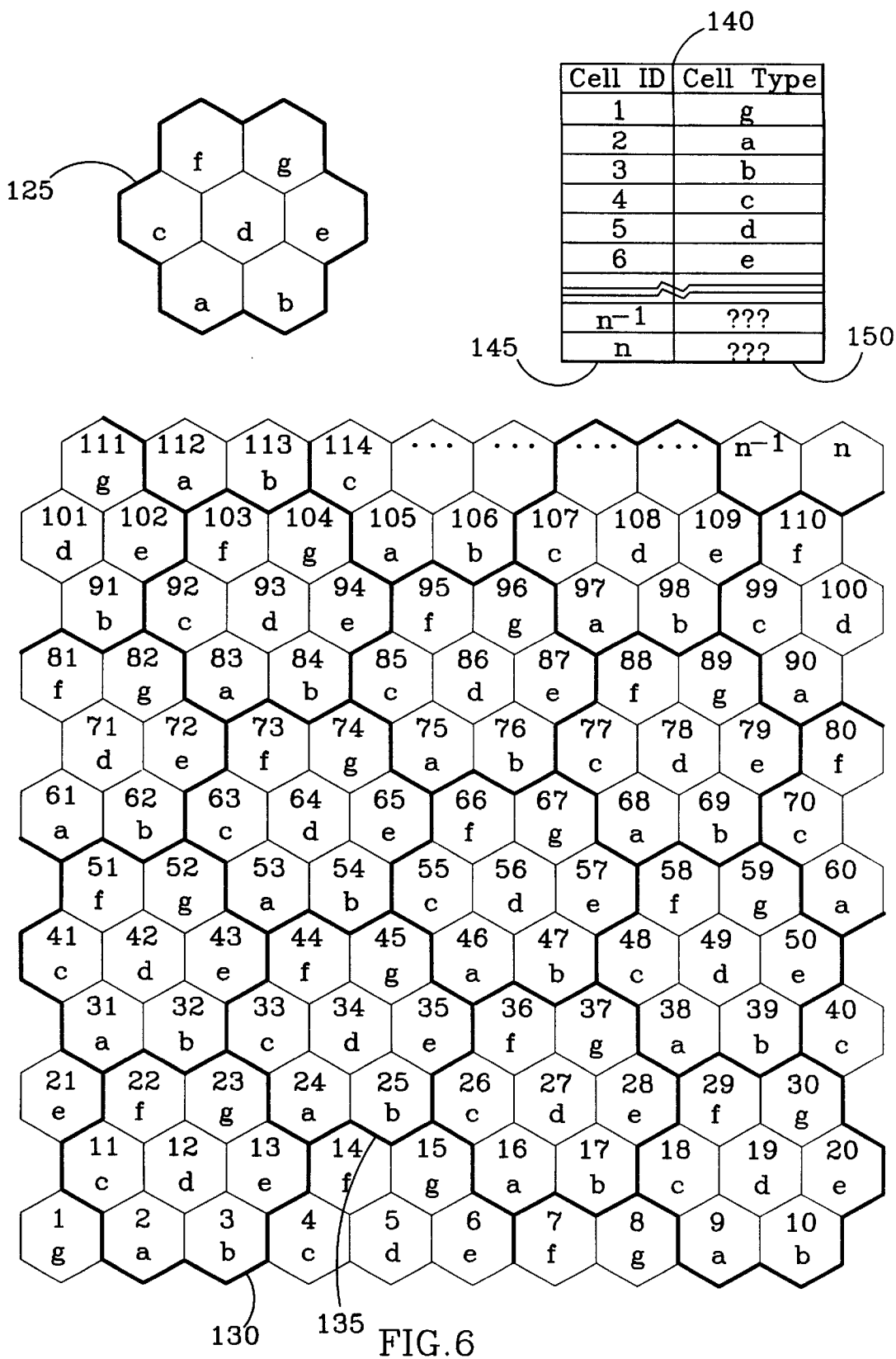
FIG. 6 is a diagram illustrating the classification of cells within a service area.

FIG. 6 illustrates how, once each cell in the service area has been identified by a corresponding numeric identifier, central processing unit 60 uses a spatial classification pattern 125 to classify the cells in the service area.

The pattern consists of a collection of adjacent cells; in FIG. 6, the pattern includes a center cell and each of the six immediately adjacent cells for the hexagonal cell assumption. The particular classification pattern used is determined by spatial restrictions to prevent interference between two cells that may be assigned the same communication channel. For instance, classification pattern 125 reflects the spatial restriction that a channel can not be used by any adjacent cell or any cell adjacent to those adjacent cells (i.e. neighbor of a neighbor). This causes classification pattern 125 to have seven distinct cell types.

Central processing unit 60 superimposes repetitive modules of the classification pattern 125 onto all of the cells in the service area. In FIG. 6, the first module 130 is positioned within the service area in a random manner. Central processing unit 60 then superimposes successive classification pattern modules onto the remaining cells in the service area in a contiguous and non-overlapping manner. For example, the second module is indicated by reference number 135.

Each cell within a given module is categorized according to it's position within the module; this is referred to as the cell "type". For example, in the illustration of FIG. 6, the lower left and right cells are respectively type "a" and "b", the middle left, center and right cells are type "c", "d" and "f" and the top left and right cells are type "f" and "g".

Central processing unit 60 creates memory array 140 in working memory 70 called the "primary type index". Memory array 140 comprises two columns of information. Column 145 stores the numeric identification of the cell and is called the cell ID column. Column 150 stores the type of the cell and is called the cell type column.

Figure 7:
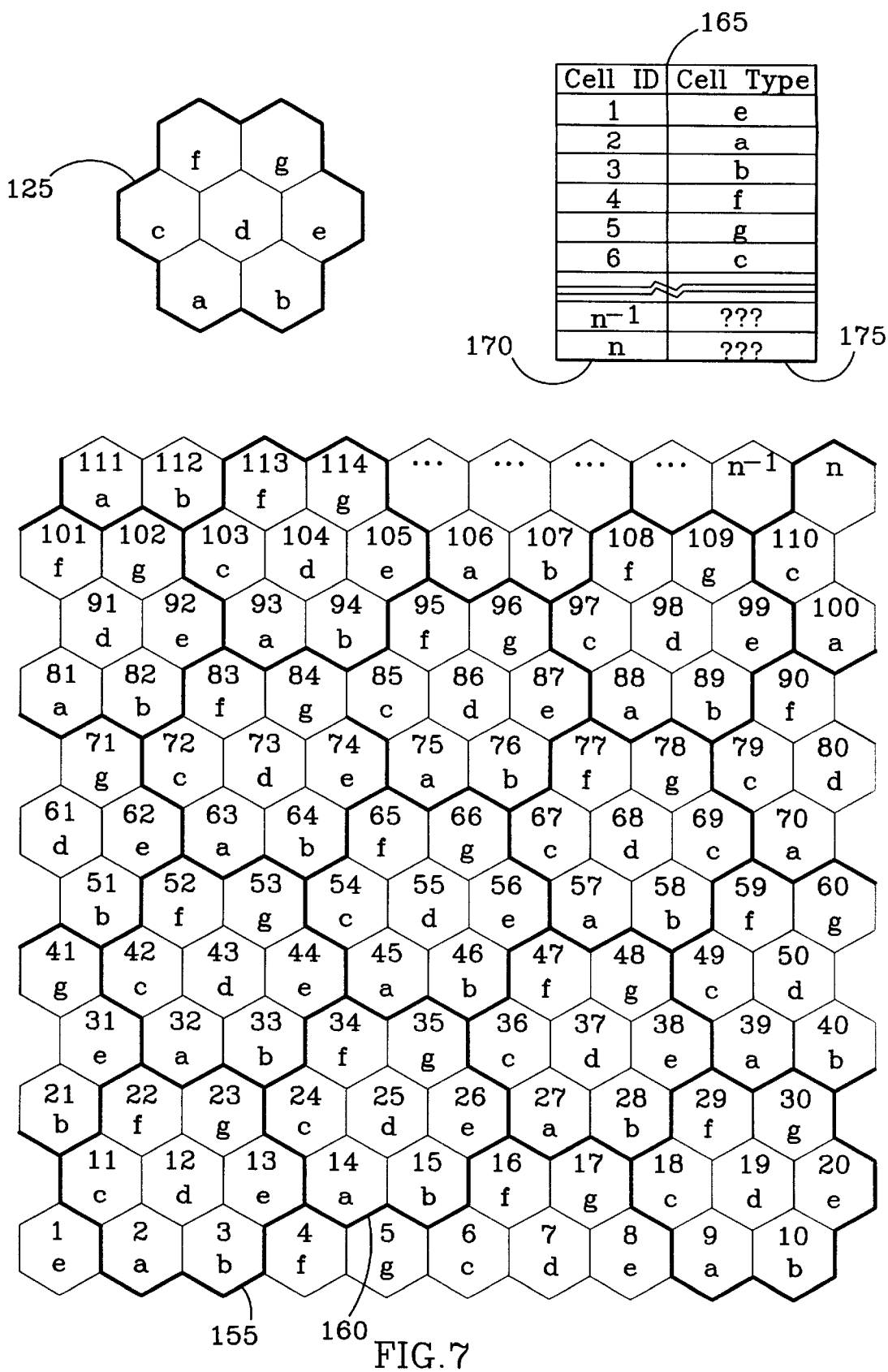
FIG. 7 is a diagram illustrating an alternate classification scheme of cells in a service area.

Central processing unit 60 then determines whether classification pattern 125 can be superimposed onto the cells in the service area in a different arrangement from the initial scheme; such an alternate arrangement is shown in FIG. 7. If an alternate arrangement is discovered, central processing unit 60 establishes an alternate cell classification by superimposing repetitive modules of the classification pattern 125 onto the cells in the service area in accordance with the new arrangement. The first module 155 of the classification pattern 125 is positioned within the service area in a random manner. Each successive module is superimposed onto the cells in a contiguous and non-overlapping manner. The second module of the alternative arrangement is indicated by reference number 160.

Although positioning of the first module for any potential arrangement may be made in a random fashion, the first module in FIG. 6, indicated by reference number 130, and the first module in FIG. 7, indicated by reference number 155, are selected to be coincident so that the placement of the second module relative to the first in each scheme can be contrasted. In the both arrangements, the first module consists of cells numbered 2, 3, 11, 12, 13, 22, and 23. In the first arrangement of FIG. 6, the second module 130 consists of cells numbered 24, 25, 33, 34, 35, 44 and 45, whereas in the alternate arrangement of FIG. 7, the second module 160 is shifted one row down from FIG. 6 and consists of cells numbered 14, 15, 24, 25, 26, 34, and 35.

Central processing unit 60 creates an array of memory elements 165 called the "secondary type index" in working memory 70 to store the alternate type for each cell based upon the alternate arrangement of FIG. 7. In a manner similar to the primary index memory array 140, a memory array 165 (called the secondary type index) stores the numeric cell identifiers in a cell ID column 170 and the cell type, as determined by the alternate arrangement, in a cell type column 175.

Composite Traffic Demand Pattern.

Referring back to FIG. 4, once the cell classification has been completed, central processing unit 60 determines the demand for communication capacity in each cell. During system initialization, central processing unit 60 executes instruction sequence 100 stored in program memory 65 to obtain numeric values representing the communication demand for each cell. The values representing communication demand are received through programming interface 80 from external computers via local area network 90. These numeric values may represent the number of cellular telephone calls that each cell will be required to accommodate during a time interval.

Central processing unit 60 sends the query to programming interface 80, which in turn relays the query via the local area network 90 to external computers. In response to this query, the external computers transmit numeric values that represent the demand for communication channels in each cell in service area 15. The external computers may elect one of several methods to determine the demand for communication channels in each cell. The first and most preferred method is to monitor the actual demand for communication channels within each cell in the service area and based upon these observation to calculate an average value for demand as a function of time for a particular time interval. The maximum value of this time-variant average is transmitted to channel allocation unit 40. The external computers could, in one alternative, calculate a stochastic prediction for the number of communication channels each cell in the service area will require.

Programming interface 80 receives the values from the external computers and stores these values in a buffer from which central processing unit 60 can later collect them.

Figure 8:
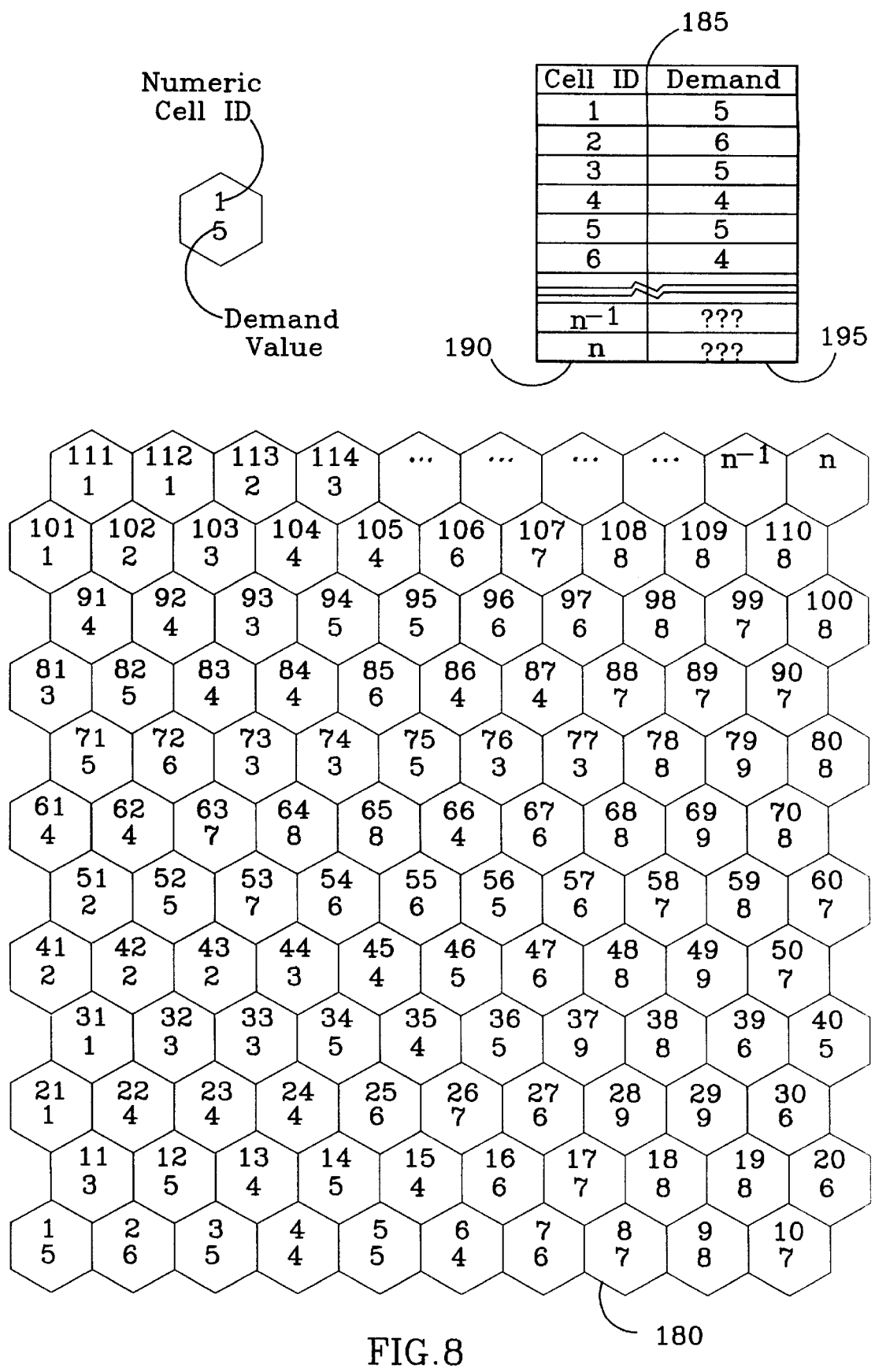
FIG. 8 is a diagram illustrating a typical composite traffic pattern for the service area.

As illustrated in FIG. 8, central processing unit 60 uses these numeric values to establish a composite traffic pattern 180. Central processing unit 60 creates a memory array 185, called the cell demand array, in working memory 70. The cell demand array 185 consists of a cell ID column 190 and a demand column 195 which stores the numeric demand values for each cell collected from the programming interface 80. The demand values shown in FIG. 8 below each cell number are for purposes of illustration only.

Demand Suppression.

Figure 9:
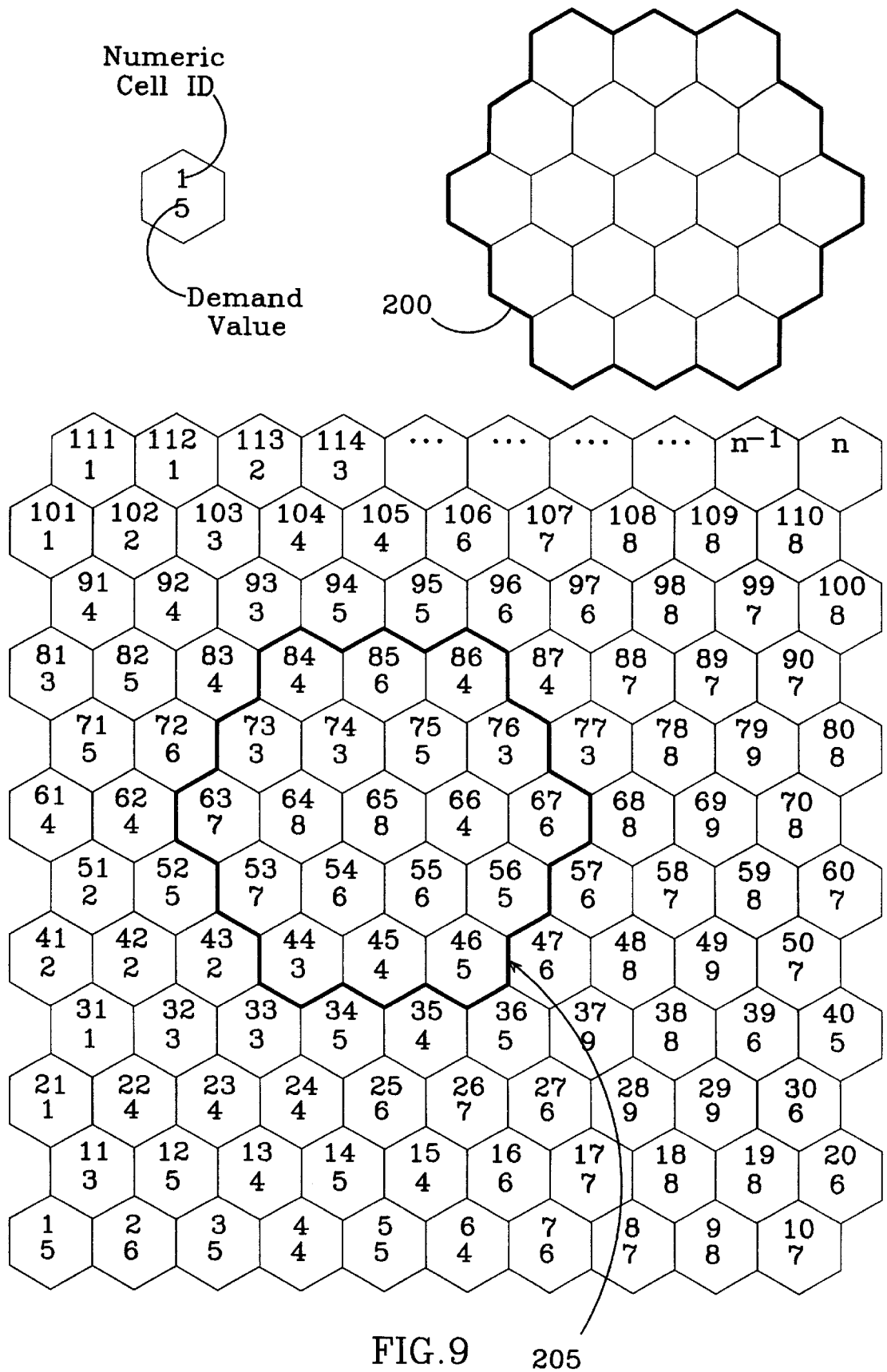
FIG. 9 is a diagram illustrating the application of a reuse zone to a cell in the service area.

Central processing unit 60 executes instruction sequence 105 to cause composite traffic pattern 180 and the demand values stored in memory array 185 to be suppressed. As illustrated in FIG. 9, demand suppression is accomplished by applying a reuse zone 200 to each cell in the service area. The reuse zone 200 consists of a center cell together with a group of cells that are within a reuse distance from the center cell. The reuse distance is determined by the concentricity of the beam patterns generated by beam forming unit 45 and phased array antenna 20. Put plainly, the antenna's radiation pattern is considered as a factor when determining the spatial separation of two cells using the same frequency.

Reuse zone 200 is superimposed onto the cells of the service area with it's center coincident with the center of a cell in the service area. In the example shown, the reuse zone is centered on cell number 65. The resultant current reuse zone 205, meaning the particular reuse zone under consideration at the moment, is then subjected to suppression.

Figure 10:
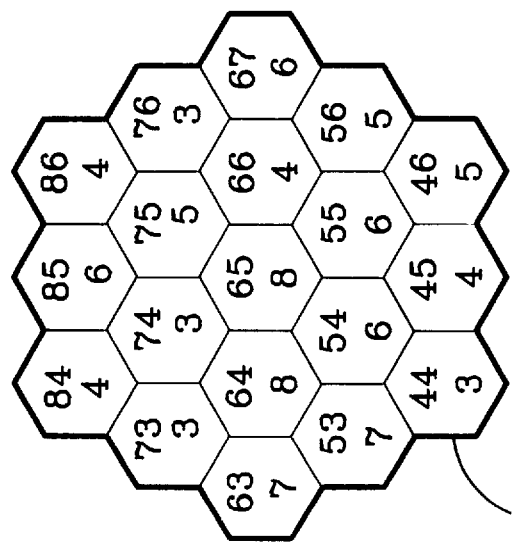
FIG. 10 is a diagram illustrating suppression of demand based on a reuse zone.
Figure 11:
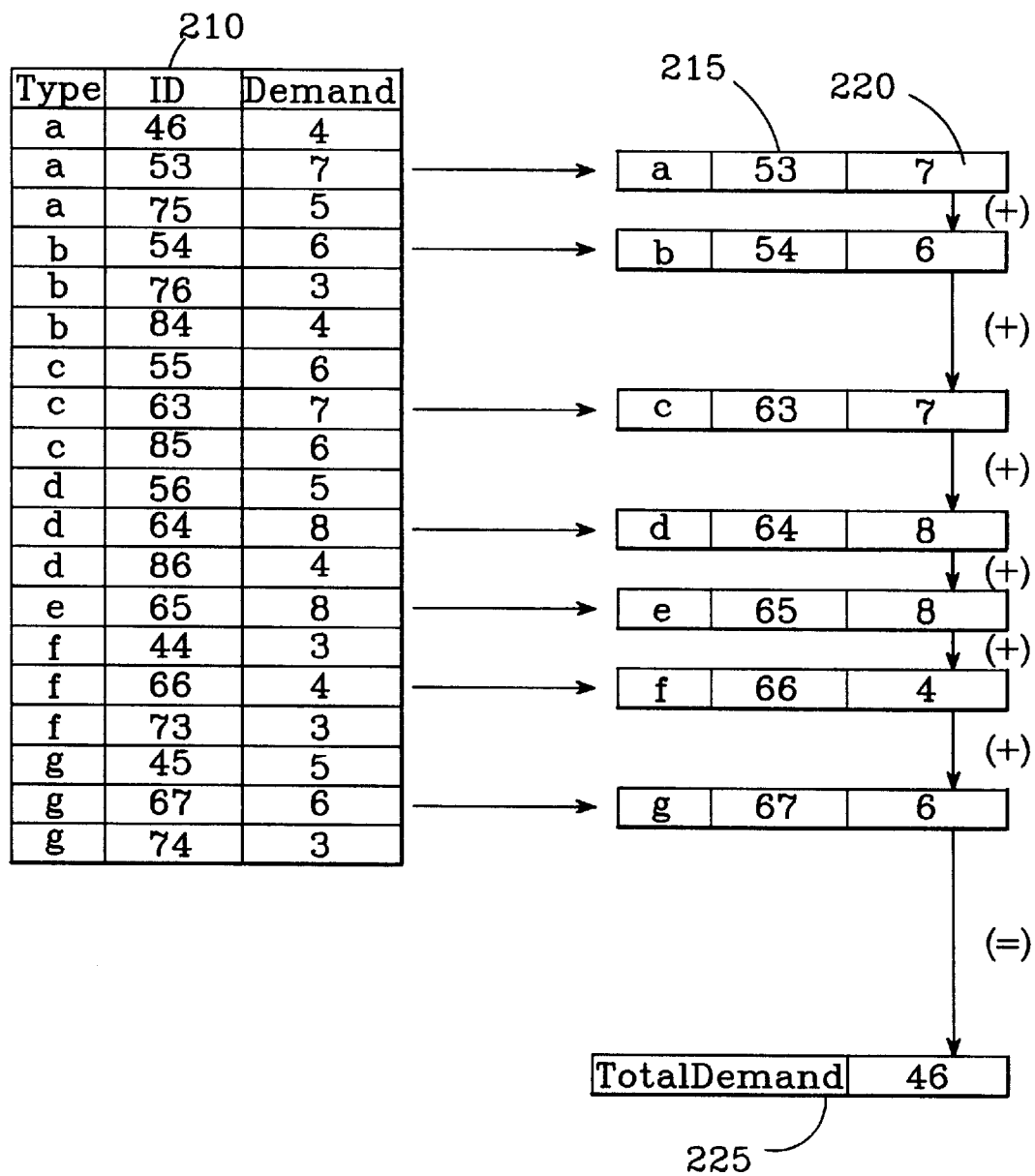
FIG. 11 presents the structure of tables necessary to complete the demand suppression.

FIG. 10 demonstrates the mechanics of demand suppression when the reuse zone 200 is centered on cell number 65. To perform demand suppression, central processing unit 60 retrieves portions of primary type index 140 and cell demand array 185 that correspond to the cells included within current reuse zone 205. Central processing unit 60 looks up the type of each cell in current reuse zone 205 and sorts the cells according to type to create a temporary suppression map 210 shown in FIG. 11. Temporary suppression map 210 tabulates which gives the cell ID numbers and corresponding channel demands for each cell type within the current reuse zone. Central processing unit 60 then selects the maximum demand value for each cell type included within the current reuse zone 205, and constructs a suppression table 215 in working memory 70.

Once central processing unit 60 constructs suppression table 215 in working memory 70, the maximum demand values 220 for each cell type are summed together to yield the reuse zone's total demand 225. Again, the particular values given in the drawings are for illustration purposes only and will vary with differing initial conditions.

Central processing unit 60 compares the total demand for the reuse zone 225 to the total number of communication channels available to the system. If the total reuse zone demand 225 is greater that the total number of available communication channels, central processing unit 60 reduces the greatest of the maximum demand values in suppression table 215 by one (1) channel, recalculates the total reuse zone demand 225, compares the new total demand against the total number of available channels, reduces the greatest of the maximum demand values in suppression table 215 for a different cell type by one (1) channel if the total demand still exceeds the number of available channels, and continues the comparison and suppression cycles until either the total reuse zone demand 225 is less than or equal to the number of available communication channels, or each of the maximum demand values for each cell type in suppression table 215 has been reduced by one (1), or the maximum demand value for one of the cell types is equal to one (1).

If the total reuse zone demand 225 is still greater than the total number of available channels, central processing unit 60 selects the greatest maximum demand value in suppression table 215 and progressively reduces it by single channel increments until either the total reuse zone demand 225 is less than or equal to the number of available channels or the maximum demand value being reduced is no longer the greatest maximum demand value in suppression table 215. If the total reuse zone demand still exceeds the number of available channels, central processing unit 60 continues the suppression by again selecting the greatest maximum demand value in suppression table 215 and repeating the sequence until the total reuse zone demand 225 is no greater than the number of available channels.

After the suppression process has been completed for the current reuse zone 205, central processing unit 60 replaces the demand values in the cell demand array 185 with the suppressed values in suppression table 215 according to the corresponding cell type. The replacement is made only for all cells in the current reuse zone 205, but only for those cells with demand values greater than the suppressed value. Central processing unit 60 then moves the reuse zone 200 so that it is centered on each cell in service area 15 in succession and performs the suppression process for each position of the reuse zone using the suppressed values from the previous iteration as the basis for the next cycle.

After suppression has been accomplished for each cell in the service area, central processing unit 60 performs similar suppression for each cell in the service area using the alternate cell classification stored in the secondary type index 165 within working memory 70.

Preferential Channel List.

After all demand suppression is complete, the demand values for each cell stored in cell demand array 185 reflect the suppressed values and not the original values collected from the external computers using programming interface 80. Once the demand has been suppressed, central processing unit 60 executes instruction sequence 110 to create the preferential channel list. The preferential channel list enumerates which channels are preferred for assignment to each cell in the system.

First, all channels that are available are segregated into three channel pools. The first pool represents the minimum number of channels that all cells in the system will need. This is called the base demand. The second demand pool represents the maximum number of channels a given type of cell will require over a particular interval of time. This is generally representative of the maximum demand each cell in the system will experience. The third pool caters to the extraordinary demand that systems experience during anomalous events such as conventions, rock concerts or fairs.

Figure 12:
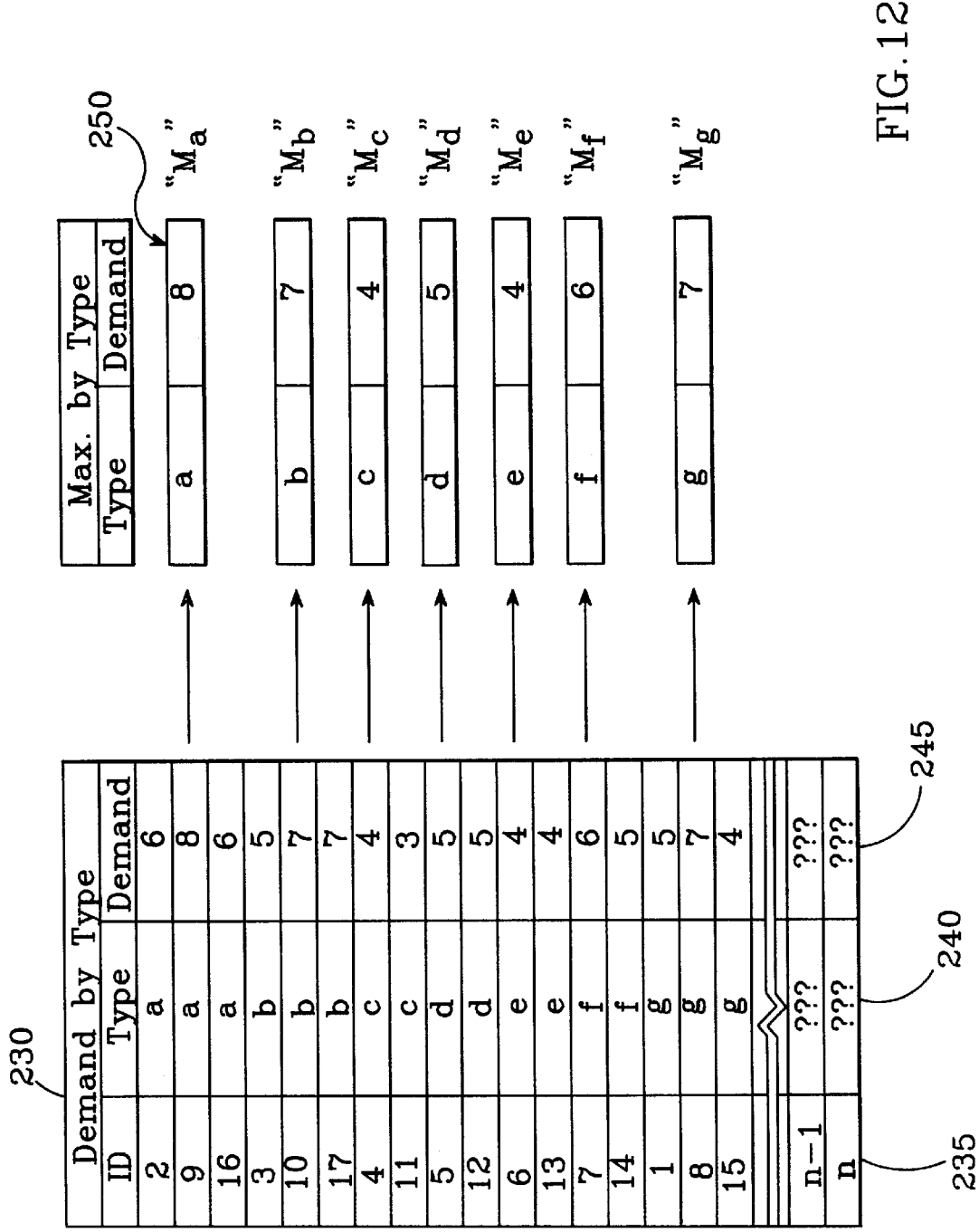
FIG. 12 presents the structure of tables necessary to identify the maximum number of channels each type of cell in the system will require.

Referring to FIG. 12, central processing unit 60 creates "cell demand by type" list 230 in working memory 70 by copying the contents of the cell demand array 185 and sorting it's content according to cell type. The cell demand by type list 230 has cell identification column 235, cell type column 240 and demand column 245. After creating the cell demand by type list in working memory 70, central processing unit 60 identifies the maximum demand values 250 for each cell type. These maximum demand values will later be referred to as $m_a$, $m_b$, ..., $m_k$, corresponding to the cell types "a", "b" through type "k", where "k" is the last type of cell in any given cell classification pattern. Central processing unit 60 then identifies the minimum demand value from among all of the maximum demand values 250 for each type of cell. In the illustration of FIG. 12, $m_e$ is the minimum value among all of the maximum demand values. This minimum value among all of the maximum demand values will later be referred to as "n".

As illustrated in FIG. 13 and FIG. 14, central processing unit 60 creates a pair of two-dimensional arrays, called "pool 1" 260 and "pool 2" 270, in working memory 70. Pool 1 will be used to supply the base demand profile for the cellular system while pool 2 will supply channels for the maximum demand profile. The two pools have respective sub-pools 265A, 265B, through 265K and 275A, 275B, through 275K with one sub-pool for each different cell type in the cell classification pattern 125. Each sub-pool 265 has a number of members equal to "n" being the minimum demand value from among all of the maximum demand values 250 for each cell type as identified from cell demand by type list 230.

Each sub-pool 275 has a number of members equal to the maximum demand value 250 for the corresponding cell type, referred to as, $m_a$ through $m_k$, less the minimum value from among all of the maximum demand values in the system introduced earlier as "n".

Figure 15:
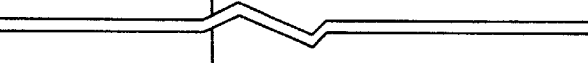
FIG. 15 presents the structure of the third of three pools used to accommodate base demand, maximum demand and anomalous events and it presents the table used to gather channel usage statistics.

Pool 1 can be represented as a matrix called P1 consisting of k rows where each row has "n" members as follows:

P1[k,n]

Where k is the number of distinct cell types in classification pattern 125 and "n" is equal to the minimum value from among all of the maximum demand values for each cell type as identified from cell demand by type list 230;

Pool 2 can be represented as a matrix called P2 consisting of k rows where each row has $m_k$ members as fol-lows:

P2[k,($m_k$-n)]

Where k is the number of distinct cell types in classification pattern 125 and $m_k$ is equal to the maximum demand value 250 for the corresponding cell type;

Referring to FIG. 15, central processing unit 60 creates a one-dimensional array of elements 280 in working memory 70 called "pool 3". Pool 3 has only one set of members. This set does not correspond to any particular cell type used in cell classification pattern 125 and is referred to as the "community" pool. The community pool is used to allocate channels that the system will use during special events when the demand for communication can not be accurately predicted.

After pools 1, 2 and 3 are created, central processing unit 60 creates a channel list 290 in working memory 70 and assigns a sequential channel number to each channel available in the system. Central processing unit 60 then allocates channels from the channel list 290 to sub-pools within pools 1 and 2.

Channels from channel list 290 are first assigned to the sub-pools in pool 1 (260). Starting with the member 1 column, central processing unit 60 assigns channels in order of the successive sub-pools 265 in pool 1 (260). The channel assignments proceed one channel at a time to successive sub-pools 265A, 265B, 265C through to the last sub-pool 265K, where K is equal to the number of types used in classification pattern 125, and then begins again with sub-pool 265A in the member 2 column. The assignment of channels continues until all of the members in sub-pools 265 are populated with channel numbers from channel list 290, or until all of the channels have been assigned, whichever comes first. The example of FIG. 12 assumes the system has 7 sub-pools, "a" through "g", that "n" equals 2 and there are 40 channels available, channels 1 through 14 are assigned to sub-pools 265A through 265G.

Channels from channel list 290 are next assigned to the sub-pools in pool 2 (270). Since the number of members in each sub-pool in pool 2 (270) is variable, if a particular sub-pool in pool 2 is filled during the assignment process, it is thereafter omitted from the assignment rotation, and the assignment rotation continues until all of the members in sub-pools 275 in pool 2 (270) are populated with channel numbers from channel list 290 or until all of the channels have been assigned, whichever occurs first. Again using the example in FIG. 12 and assuming $m_a$=4, $m_b$=3, $m_c$=4, $m_d$=4, $m_e$=3, $m_f$=2 and $m_g$=2, channels 15 through 36 are assigned to sub-pools 275A through 275G.

Central processing unit 60 assigns any channels that are left in channel list 290 to pool 3 (280). Given the example where only 40 channels are available, the remaining channels 37 through 40 are thus assigned to pool 3 (280).

Once all of the channels from channel list 290 are placed in pool 1 (260), pool 2 (270) and pool 3 (280), central processing unit 60 interrogates programming interface 80 to discover how many times each channel will be reused in the system. This is called the target reuse rate. The target reuse rate is then written into the quantity available elements of pool 1 (260), pool 2 (270) and pool 3 (280). The quantity available elements will then be used to track the number of times a particular channel has been allocated to the cells.

Preferential Channel Allocation.

Figure 16:
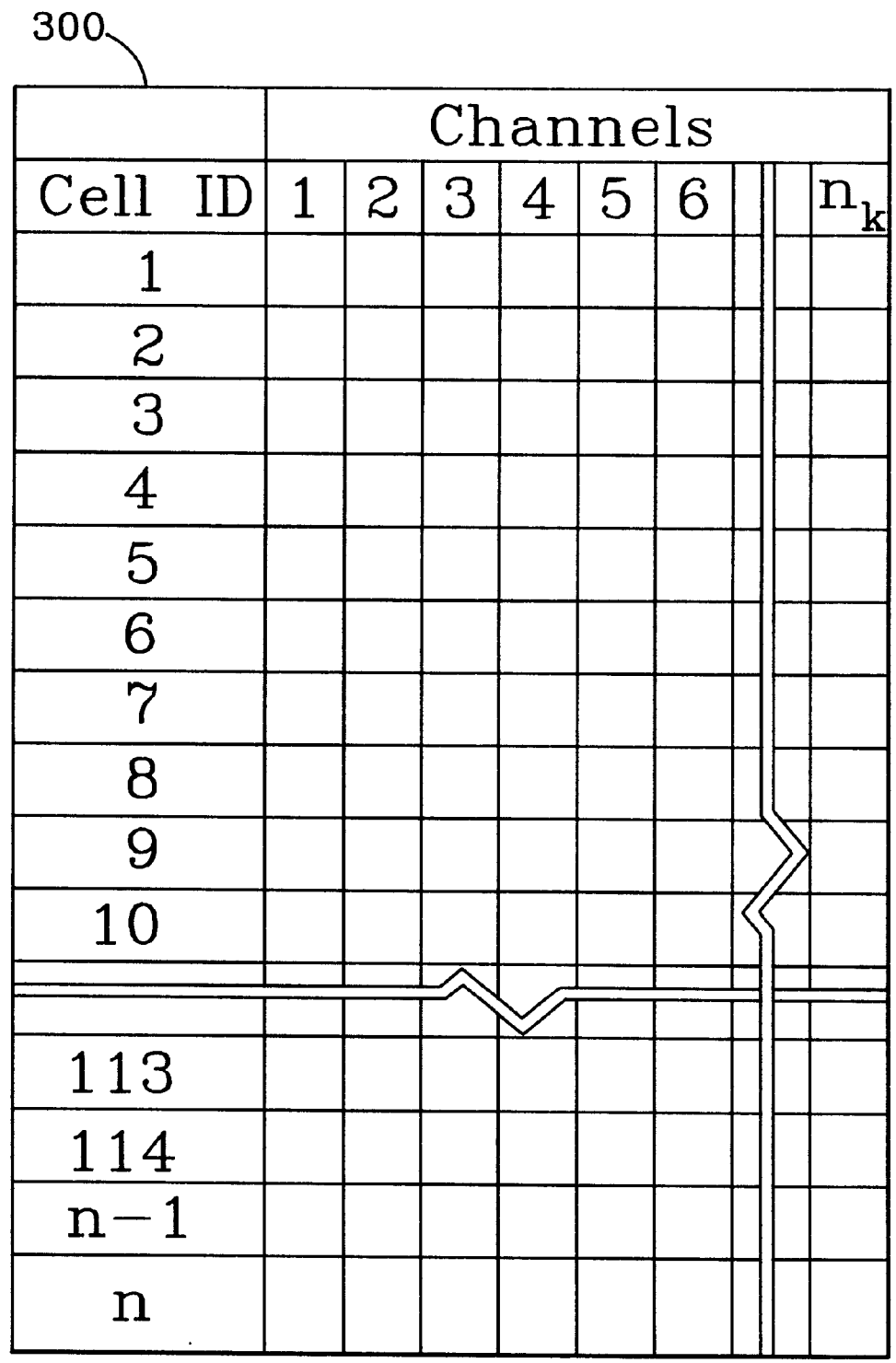
FIG. 16 presents the structure of the preferential channel list for each cell in the service area.

Referring to FIG. 16, The preferential channel list for each cell in the service area 15 is created by central processing unit 60 by drawing channel numbers from the three demand pools; the base demand pool 1 (260), the maximum demand pool 2 (270) or from community pool 3 (280). Central processing unit 60 maintains usage statistics for each channel in the system by incrementing a channel usage counter 295 whenever a channel is selected for assignment. Usage counter 295 is part of the channel list 290 originally introduced in FIG. 15. Central processing unit 60 uses the channel usage counter to determine which channels are most frequently used or which channels are least frequently used and may use these statistics as part of the channel selection criteria.

Central processing unit 60 observes three criteria when allocating channel numbers to the individual lists that specify the preferred channels for any given cell. The first criteria is that a channel that is to be allocated to a cell must be statutorily allowable in that cell. The second criteria ensures that a channel is not already in use by a cell's neighbors. Finally, reverence is paid to the target reuse rate in order to minimize inter cell interference.

Central processing unit 60 begins to allocate channels to those cells in the system that have the greatest demand for communication channels. These cells are known as "heavy cells". Allocating channels to one cell at a time, central processing unit 60 attempts to select a channel from sub-pool 265 of pool 1 (260) that corresponds to the type of cell for which a channel is being selected. If corresponding sub-pool 265 in pool 1 (260) has one or more available channels, central processing unit 60 selects the most often used channel from that sub-pool.

If pool 1 (260) does not have a channel available for the allocation, central processing unit 60 attempts to allocate a channel from the sub-pool 275 of pool 2 (270) that corresponds to the type of cell for which a channel is being selected. If the corresponding sub-pool 275 in pool 2 (270) has one or more available channels, central processing unit 60 selects the most often used channel from that sub-pool.

If pool 2 (270) does not have an available channel to satisfy the allocation, central processing unit 60 attempts to select an available channel from community pool 3 (280).

If pool 3 does not have an available channel, central processing unit 60 then attempts to select a channel from pool 2 (270) from any sub-pool 275 other than the one that corresponds to the type of cell for which the channel is being selected.

If pool 2 (270) cannot satisfy the allocation request due to a lack of available channels, central processing unit 60 attempts to select an available channel from pool 1 (260) from any sub-pool 265 other then the one that corresponds to the type of cell for which the channel is being selected.

Whenever a channel from pool 1 (260), pool 2 (270) or pool 3 (280) is allocated to a cell, the quantity available element affiliated with that channel number in that particular pools is decremented by one. Once the quantity available elements has been decremented to zero (0), that channel can no longer be allocated to cells.

Once central processing unit 60 allocates channels from the pools to the heavy cells, central processing unit allocates channels to the cells immediately adjacent to the heavy cells. After these neighboring cells have received channel allocation, channels are allocated to all of the remaining cells in the system.

Referring to FIG. 16, where the structure of the preferential channel list 300 is depicted, each cell in the system has a row of elements that store channel numbers for the corresponding cell. The channel numbers stored in these rows enumerate the channels that should preferably be assigned to the corresponding cell whenever a channel request is pending in that cell.

The rows have varying numbers of channels assigned to them. The number of elements in each row of preferential channel list 300 is equivalent to the suppressed demand for channels in that cell as recorded in the cell demand table 185.

Once the preferential channel allocation is completed, central processing unit 60 determines if a sufficient number of channels were available to satisfy the suppressed demand for each cell as dictated in cell demand array 185.

If there were not enough channels available from the pools to satisfy the demand for each cell in service area 15, central processing unit 60 increases the target reuse rate and attempt the preferential channel allocation process anew.

Dynamic Channel Assignment.

The preferential channel list for each cell 300, as formed from the various sub-pools, has an implied spatial separation of usable channels within each cell. Assigning channels from the preferential list minimizes the probability that a subsequent request for channel assignment will result in a blocked call.

During actual system operation, whenever a call request is made by a communication terminal 25, the transponder 35 makes a channel request to channel allocation unit 40. With the initialization phase complete, channel allocation unit 40 executes instruction sequence 120 in order to select a channel for assignment to a given cell based on that cell's identifier.

For each cell in the system, there are three categories of channels that are available for assignment: preferred channels; neutral channels; and non-preferred channels. The preferred channels are those channels listed in that cell's preferential channel list 300. Non-preferred channels are those channels that are listed in the preferred channel list of that cell's immediate neighbors. All other channels are categorized with a neutral designation.

In order to accommodate a channel request, central processing unit 60 first determines the identifier of the cell requesting a channel assignment. With this information, central processing unit 60 examines the channel number entries in preferential channel list 300 for the row that corresponds to the cell number requesting the assignment. This establishes the set of preferred channels for the assignment. Central processing unit 60 then examines the contents of the preferential channel list for all of the cell's neighbors. This establishes the set of non-preferred channels for the assignment. All other channels are then categorized as neutral. For each of these categories of channels, central processing unit 60 further distinguishes each channel according to channel assignments constraints. Hence, in each set, each channel is marked for excessive channel reuse, regulatory availability, and neighbor usage. If none of these constraints are applicable, the channel is marked as available.

If the set of preferred channels for that cell has only one channel that is available for use, i.e. that one channel has not been eliminated due to channel assignment constraints, central processing unit 60 selects that channel for assignment.

If the set of preferred channels has more than one channel available for use, central processing unit 60 selects the channel with a reuse value less than the minimum reuse value for all the candidate channels. If there are still more than one candidate channel, central processing unit 60 selects the channel with the most beneficial weighted usefulness factor. Weighted usefulness factor is described below.

If the set of preferred channels simply can not accommodate the demand for a channel assignment, central processing unit 60 attempts to assign a channel from the neutral set of candidates. If there is exactly one channel available from the set of neutral candidate channels, central processing unit 60 selects that channel for the assignment.

If the set of neutral channels has more than one channel available for use, central processing unit 60 selects the channel with a reuse value less than the minimum reuse value for all the candidate channels. If there are still more than one candidate channel, central processing unit 60 selects the channel with the most beneficial weighted usefulness factor.

If the neutral set of candidate channels can not satisfy the demand for a channel assignment, then central processing unit 60 resorts to the non-preferred set of channels. If there is exactly one channel available from the set of non-preferred candidate channels, central processing unit 60 selects that channel for the assignment.

If the set of non-preferred channels has more than one channel available for use, central processing unit 60 selects the channel with a reuse value less than the minimum reuse value for all the candidate channels. If there are still more than one candidate channel, central processing unit 60 selects the channel with the most beneficial weighted usefulness factor.

Once central processing unit 60 has selected a channel from either the preferred, neutral or non-preferred candidate sets, it communicates the channel number to transponder 35 via the channel allocation unit's satellite interface 75.

Channel Deassignment.

As the demand within each cell falls, central processing unit 60 deassigns a dormant channel, i.e. a channel within the cell that is no longer carrying communication traffic. The deassignment process causes that channel to be returned to the preferential channel list 300 for that cell. Once the channel has been returned to the preferential channel list 300, it can again be assigned to a cell as the demand for communication channels increases.

Weighted Usefulness Factor.

Each time central processing unit 60 dynamically assigns a channel to a cell, it calculates a weighted usefulness factor for each candidate channel. The weighted usefulness factor measures the likelihood that any particular channel will be required by that cell's neighbors. The weighted usefulness factor is based on the current traffic load within the system and upon the channels that are available for use in neighboring cells.

For any given cell that requires a channel assignment, central processing unit 60 builds usefulness table 330 in working memory 70 with the structure presented in FIG. 17. Usefulness table 330 has a number of rows equal to the number of cells in the reuse zone 200 (as used during demand suppression). Each of these rows is identified as a neighbor row with an index of 1 through 18 so that each row can be referred to by the notation NB[i], i=1 ... 18. The number of columns in table 330 reflects the total number of channels that are eligible for allocation to each of the cells in reuse zone 200 when the center of the reuse zone is placed upon the cell needing the channel assignment. In FIG. 17, these channels are referred to as $f_1$ through $f_n$. Two additional columns, channel sum ($S_i$) column 335 and weight ($W_i$) column 340, are also incorporated into table 330. Each element in usefulness table 330 may be referred to by the notation NB[i, $f_n$].

Central processing unit 60 examines each of the neighbors in reuse zone 200. If a channel can be used in that cell, central processing unit 60 places a one (1) in the corresponding columns of table 330. If the channel can not be used in that cell, central processing unit 60 places a zero (0) into that column. Once the candidacy of each channel for each cell is determined, central processing unit 60 will tally the number of channels that are available in each cell. This tally is then stored in the $S_i$ column 335. Central processing unit 60 calculates a weight for each cell based on the number of channels that are actively being used in the cell divided by the number of channels assigned to the cell.

Once the weights have been calculated, central processing unit 60 calculates the weighted usefulness factor for each of the channels that are eligible for assignment in that cell. Central processing unit 60 multiplies the one or zero in the column that corresponds to that channel by the quotient of $W_i/S_I$ so that for each channel:

$$WUF[fn] = \sum_{i=1}^{19} \left\{ NB[i, fn] \cdot \left[\frac{Wi}{Si}\right] \right\}$$

The channel with the lowest calculated weighted usefulness factor is then selected for assignment in deference to those channels with higher values of weighted usefulness factor.

We claim:

1. A process for communicating with a plurality of communication cells within a service area through a limited number of communication channels with low inter-cell channel interference comprising:

a) establishing a preferential order for as-signing channels to the cells based upon (1) the anticipated demand for communication capacity within the cells in the service area, and (2) the maintenance of a spatial separation between cells to which the same channel is assigned to reduce interference between nearby cells and the cells proximate thereto; and b) assigning channels to the cells based upon the demand for communication channels by each cell in accordance with the preferential channel order of step (a) and communicating with the cells through their respective assigned channels wherein said preferential order for assigning channels is established by:

c) classifying each cell in the service area in accordance with a minimal set of cell types;

d) establishing a composite traffic pattern representative of the demand for communication channels from each cell in the service area;

e) suppressing the composite traffic pattern so that the total number of channels demanded is reduced to the number of channels available in the communication system;

f) associating each available channel in the system with particular cells based on the number of channels demanded by those cells as indicated by the suppressed composite traffic pattern; and g) assigning communication channels to cells in the system that require additional communication capacity based on the association of certain channels with particular cells.

2. The process of claim 1, wherein each cell is classified by:

h) defining a cell classification pattern of a minimal number of contiguous cells in which each cell in the pattern is designated with a peculiar type;

i) imposing successive modules of the cell classification pattern onto the cells within the service area in a contiguous and non-overlapping manner; and j) categorizing each cell in the service area with the cell type which identifies it's position within it's respective module of the cell classification pattern.

3. The process of claim 1, wherein said composite traffic pattern is established by:

k) receiving the number of channels each cell in the service area will require from an external source; and l) affiliating the number of channels required by the cell with that cell to form a spatial pattern for the demand across the entire service area.

4. The process of claim 3, wherein said demand for communication channels in each cell in the service area is determined by the external source by means of a stochastic estimate of the number of channels necessary to sustain the communication traffic within each cell in the service area during a time interval.

5. The process of claim 3, wherein said demand for communication channels in each cell in the service area is determined by the external source by monitoring the actual demand for communication channels by each cell in the service area during an interval of time and calculating an average demand for communication channels over that time interval and selecting the maximum value of that average during that interval of time.

6. The process of claim 1, wherein said composite traffic demand pattern is suppressed by:

m) establishing a channel reuse zone that contains a contiguous congregation of cells with a low level of inter-cell channel interference;

n) centering the channel reuse zone upon a cell in the service area;

o) determining the aggregate number of communication channels required by the cells within the channel reuse zone by summing together the maximum values among all of the demand values for each cell type;

p) reducing the number of channels required by each cell type in the channel reuse zone by one progressively by cell type in order of greatest demand until either the aggregate number of channels required by all cell types in the channel reuse zone is equal to the total number of available communication channels or until one of the cell types in the reuse zone has been reduced to a demand of one channel;

q) reducing the number of channels required in the cell type that requires the greatest number of communication channels by one until either the aggregate number of channels required by all cell types is less than or equal to the total number of available communication channels or until that cell type no longer requires the greatest number of communication channels;

r) repeating step (q) until the aggregate quantity of channels required by all cell types is equal to the total number of available communication channels;

s) repositioning the channel reuse zone so that it is centered upon another cell in the service area and repeating steps (n), (o), (p), (q) and (r) for the new channel reuse zone position using the results of steps (n), (o), (p), (q) and (r) from the previous channel reuse zone position; and t) performing step (s) for each cell in the service area.

7. The process of claim 1, wherein each available channel is associated with a particular cell by:

u) establishing a pool P1 that has a set of sub-pools equal to the number of cell types used to classify the cells with each sub-pool in pool P1 corresponding to a respective cell type and having a number of members equal to the minimum value among all of the maximum demands for communication channels for each cell type in the system as indicated by the suppressed composite traffic pattern of demand so as to create a matrix in the form of:

$$P1[k,n]$$

Where k is the number of distinct classes used to classify the cells in the service area and "n" is the minimum value among the maximum demand values for all of the cell types in the service area;

v) establishing a pool P2 that has a set of sub-pools wherein the number of sub-pools in P2 is equal to the number of classes used to classify the cells in the service area and each sub-pools corresponds to a respective cell type and having a quantity of members equal to the maximum value of demand among all of demands for communication channels for each cell of that particular type as indicated by the suppressed composite traffic pattern of demand so as to create a matrix in the form of:

$$P2[k,(m_k-n)]$$

where "k" is the number of distinct classes used to classify the cells in the service area, "$m_k$" is the maximum value of the demand among all of the cells in the service area of type "k" and "n" is the minimum value from among all of the maximum demand values for all cells in the system;

w) allocating communication channels progressively by sub-pool to pool P1 by committing successive single communication channels to corresponding single members of successive sub-pools until all of the members of each sub-pool have been allocated a channel or no more communication channels are available;

x) allocating communication channels progressively by sub-pool to pool P2 by committing successive single communication channels to corresponding single members of successive sub-pools until all of the members of each sub-pool have been allocated a channel or no more communication channels are available;

y) allocating any remaining communication channels to another pool P3;

z) creating a reuse counter for each channel in each sub-pool of pools 1 and 2 and each channel in pool 3, receiving a target reuse rate from an external source and setting the initial value of all of the reuse counters for all of the channels in each sub-pool of pools 1 and 2 and in each channel of pool 3 to the received value;

aa) creating a preferential channel list for each cell in the service area;

bb) selecting a channel whose reuse rate counter in not zero for the preferential channel list for a cell of type "k" from the matrix:

$P1[k,n]$ and assigning the channel to the preferential list for that cell until the number of communication channels required in the cell is satisfied, or the sub-pool for type "k" cells in pool P1 is exhausted and then decrementing the channel reuse rate counter for the channel that was assigned;

cc) selecting a channel whose reuse rate counter in not zero for the preferential channel list for a cell of type "k" from the matrix:

$P2[k,(m_k-n)]$ and assigning the channel to the cell from pool P2 only if the demand for channels in the cell has not been satisfied by step bb) and then only until either the number of communication channels required is satisfied, or the sub-pool for type "k" cells in pool P2 is exhausted and then decrementing the channel reuse rate counter for the channel that was assigned;

dd) selecting channels whose reuse rate counter in not zero for the preferential channel list from a pool P3 and assigning the channels to the cell only if the demand for channels in the cell has not been satisfied by steps bb) or cc), and then only until the number of communication channels required is satisfied or the pool P3 is exhausted and then decrementing the channel reuse rate counter for the channel that was assigned;

ee) selecting channels whose reuse rate counter in not zero for the preferential channel list for a cell of type "k" from the matrix:

$P2[q,(m_q-n)]$ where "q"≠"k" and assigning the channels to the cell only if the demand for channels in the cell has not been satisfied by steps bb), cc) or dd) and then only until either the number of communication channels required is satisfied or the sub-group for type n cells in group P2 is exhausted and then decrementing the channel reuse rate counter for the channel that was assigned;

ff) repeating step (ee) as often as necessary to satisfy the demand for communication channels by the cell by setting "q" equal to every other cell type used in the classifying the cells in the service area;

gg) repeating steps (bb), (cc), (dd), (ee), (ff), (dd) and (ee) for all other cells in the system in order to compile the complete preferential channel list of step (aa); and hh) repeating steps (cc), (dd), (ee), (ff), (dd), (ee) and (gg) if the demand for any cell was not fully satisfied but only after increasing the target reuse rate and reinitializing each target reuse rate counter for each channel in each sub-pool of pools 1 and 2 and in each channel of pool 3 with the increased value.

8. The process of claim 1, wherein a channel is assigned to a cell requiring additional communication capacity by:

ii) selecting as preferred the group of channels associated with the particular cell requiring additional communication capacity, selecting as not preferred the group of channels associated with the cells immediately adjacent to the cell requiring additional communication channels and selecting as neutral all remaining channels;

jj) refining the set of selected channels to exclude all channels that are constrained by reuse rate or by statutory regulation or are currently in use by that cell or by cells immediately adjacent to that cell so as to identify which channels are available for assignment;

kk) calculating a weighted usefulness factor for each available channel by determining how many channels are available within a reuse zone, establishing a weighting score for each of the cells immediately adjacent to the cell requiring additional communication capacity and summing together those quotients of the weighting score and the number of channels available in each adjacent cell for those adjacent cells that the available channel can itself be assigned to where the weighted score is derived by dividing the number of channel in use by the adjacent cell by the number of channels assigned to the adjacent cell;

ll) selecting the channel with the most beneficial reuse rate plus a slack value or then the channel with the most beneficial weighted usefulness factor from among the available preferred channels and assigning it to the cell requiring additional channels;

mm) selecting the channel with the most beneficial reuse rate plus a slack value or then the channel with the most beneficial weighted usefulness factor from among the available neutral channels and assigning it to the cell requiring additional channels; and nn) selecting the channel with the most beneficial reuse rate plus a slack value or then the channel with the most beneficial weighted usefulness factor from among the available not preferred channels and assigning it to the cell requiring additional channels.

9. The process of claim 1, wherein each cell is classified by:

oo) defining a cell classification pattern of a minimal number of contiguous cells in which each cell in the pattern is designated with a peculiar type to distinguish that cell by it's spatial position relative to other cells in the classification pattern;

pp) imposing successive positions of the cell classification pattern onto the cells within the service area in a contiguous and non-overlapping manner;

qq) categorizing each cell in the service area with a cell type which identifies it's position within it's relative classification pattern;

rr) creating an array of memory locations in the computer to store the type of each cell.

10. The process of claim 1, wherein a channel is assigned to a cell requiring additional communication capacity by:

rr) building in memory a list of candidate channels by reading from memory the contents of the preferred channel list the channels associated with the particular cell requiring additional communication capacity and marking these as preferred, reading from memory the group of channels associated with the cells immediately adjacent to the cell requiring additional communication channels and marking these as not preferred and marking all other channels available in the system as neutral and storing all of these in the candidate channel list;

ss) eliminating channels from the candidate list by excluding all channels that are constrained by reuse rate or by statutory regulation or are currently in use by that cell or by cells immediately adjacent to that cell so as to identify which channels are available for assignment;

tt) calculating a weighted usefulness factor for each available channel in the candidate list by determining how many channels are available within a reuse zone, establishing a weighting score for each of the cells immediately adjacent to the cell requiring additional communication capacity and summing together those quotients of the weighting score and the number of channels available in each adjacent cell for those adjacent cells that the available channel can itself be assigned to where the weighted score is derived by dividing the number of channel in use by the adjacent cell by the number of channels assigned to the adjacent cell;

uu) selecting from the candidate list the channel with the most beneficial reuse rate plus a slack value or then the channel with the most beneficial weighted usefulness factor from among the available preferred channels and assigning it to the cell requiring additional channels;

vv) selecting from the candidate list the channel with the most beneficial reuse rate plus a slack value or then the channel with the most beneficial weighted usefulness factor from among the available neutral channels and assigning it to the cell requiring additional channels; and ww) selecting from the candidate list the channel with the most beneficial reuse rate plus a slack value or then the channel with the most beneficial weighted usefulness factor from among the available not preferred channels and assigning it to the cell requiring additional channels.

11. A process for communicating with a plurality of communication cells within a service area through a limited number of communication channels with low inter-cell channel interference comprising:

a) establishing a preferential order for as-signing channels to the cells based upon (1) the anticipated demand for communication capacity within the cells in the service area, and (2) the maintenance of a spatial separation between cells to which the same channel is assigned to reduce interference between nearby cells and the cells proximate thereto; and b) assigning channels to the cells based upon the demand for communication channels by each cell in accordance with the preferential channel order of step (a) and communicating with the cells through their respective assigned channels wherein said channels are assigned to the cells by:

xx) classifying each cell in the service area in accordance with a predetermined minimal set of cell types so as to distinguish each cell by its spatial position relative to other cells proximate thereto;

yy) accepting numeric values indicative of the amount of communication traffic that can be expected in each cell;

zz) reducing the numeric values indicative of the amount of communication traffic that can be expected in each cell to an amount that can be accommodated by the number of available channels;

aaa) associating each available channel with a cell based upon the reduced amount of communication traffic;

bbb) selecting a channel from the channel to cell association whenever the satellite determines that that cell requires a communication channel; and ccc) communicating the number of the selected channel to the satellite so that the satellite can use that channel to communicate with communication terminals.

12. The process of claim 11, wherein the numeric values indicative of the amount of communication traffic that can be expected in each cell are reduced by:

ddd) establishing a channel reuse zone that contains a contiguous congregation of cells with a low level of inter-cell channel interference;

eee) identifying the cells that are in the channel reuse zone when it is centered upon a cell in the service area;

fff) reading the numeric value indicative of traffic demand and the type representative of the cell's relative position within the classification pattern from the computer's memory for each cell identified as being within the channel reuse zone;

ggg) selecting the maximum value among all of the traffic demand values for each cell type and summing these values together to obtain an aggregate channel demand for the reuse zone and storing the value in memory;

hhh) repetitively reducing the maximum value among all of the demand values for each cell type that is a constituent of the aggregate channel demand for the reuse zone by reducing the value demanded by each cell type in order of the greatest demand by one until the reuse zone demand is less than or equal to the number of channels available in the system or one of the cell types has a demand of one and then storing the reduced values of the maximum anticipated demand in the memory affiliated with those cells in lieu of the values retrieved in step (fff);

iii) selecting the cell type with the greatest demand from among all of the cells in the reuse zone and reducing it's demand by one until the aggregate channel demand for the reuse zone is equal to the number of communication channels available in the system or until that cell type is no longer the cell type with the greatest demand for communication channels;

jjj) repeating step (iii) until the aggregate channel demand for the reuse zone is less than or equal to the number of channels available in the system; and kkk) repeating steps (eee), (fff), (ggg), (hhh), (iii), and (jjj) using the results of the previous steps (eee), (fff), (ggg), (hhh), (iii), and (jjj) as the basis for the successive iteration for each cell in the system.

13. The process of claim 11, wherein each available channel is associated with cells in the system by:

lll) creating a two-dimensional array in the computer's memory pool P1 that has a set of sub-pools equal to the number of cell types used to classify the cells with each sub-pool in pool P1 corresponding to a respective cell type and having a number of members equal to the minimum value among all of the maximum values indicative of the demand for communication channels for each cell type in the system as indicated by the reduced traffic pattern of demand in the form of:

$$P1[k,n]$$

where "k" is the number of distinct classes used to classify the cells in the service area and "n" is the minimum value among the maximum demand values for all of the cell types in the service area;

mmm) creating a memory array in the computer's memory pool P2 that has a set of sub-pools wherein the number of sub-pools in P2 is equal to the number of classes used to classify the cells in the service area and each sub-pools corresponds to a respective cell type and having a quantity of members equal to the maximum value of demand among all of demands for communication channels for each cell of that particular type as indicated by the suppressed composite traffic pattern of demand in the form of:

$$P2[k,(m_k-n)]$$

where "k" is the number of distinct classes used to classify the cells in the service area, "$m_k$" is the maximum value of the demand among all of the cells in the service area of type "k" and "n" is the minimum value from among all of the maximum demand values for all cells in the system;

nnn) allocating communication channels progressively by sub-pool to pool P1 by committing successive single communication channels to corresponding single members of successive sub-pools until all of the members of each sub-pool have been allocated a channel or no more communication channels are available;

ooo) allocating communication channels progressively by sub-pool to pool P2 by committing successive single communication channels to corresponding single members of successive sub-pools until all of the members of each sub-pool have been allocated a channel or no more communication channels are available;

ppp) creating another memory array pool P3 in the computer's memory and allocating any remaining channels thereto;

qqq) creating a reuse rate counter in memory for each channel in each sub-pool of pools P1 and P2 and each channel in pools P3, receiving a target reuse rate from an external source and setting the initial value for all of these target reuse counters established in memory equal to the received value;

rrr) creating a preferred channel list for each cell in the system in the computer's memory;

sss) selecting a channel whose reuse rate counter is not zero for a cell of type "k" from the matrix:

$$P1[k,n]$$

and storing in memory the number of the selected channel in the preferred channel list for that cell until the number of communication channels required in the cell is satisfied, or the sub-pool for type "k" cells in pool P1 is exhausted and then decrementing the reuse rate counter for that channel;

ttt) selecting a channel whose reuse rate counter is not zero for a cell of type "k" from the matrix:

$$P2[k,(m_k-n)]$$

and storing the number of the selected channel in the preferred channel list for that cell from pool P2 only if the demand for channels in the cell has not been satisfied by step (sss) and then only until either the number of communication channels required is satisfied, or the sub-pool for type "k" cells in pool P2 is exhausted and then decrementing the reuse rate counter for that channel;

uuu) selecting a channel whose reuse rate counter is not zero from a pool P3 and storing the number of the selected channel in the preferential channel list for that cell only if the demand for channels in the cell has not been satisfied by steps (sss) or (ttt), and then only until the number of communication channels required is satisfied or the pool P3 is exhausted and then decrementing the reuse rate counter for that channel;

vvv) selecting a channel whose reuse rate counter is not zero for a cell of type "k" from the matrix:

$$P2[q,(m_q-n)]$$

where "q"≠"k" and storing the number of the selected channel in the preferential channel list for that cell only if the demand for channels in the cell has not been satisfied by steps (sss), (ttt) or (uuu) and then only until either the number of communication channels required is satisfied or the subgroup for type n cells in group P2 is exhausted and then decrementing the reuse rate counter for that channel;

www) repeating step (vvv) as often as necessary to satisfy the demand for communication channels by the cell by setting "q" equal to every other cell type used in the classifying the cells in the service area;

xxx) repeating steps (sss), (ttt), (uuu), (vvv) and (www) for each cell in the service area; and yyy) repeating steps (sss), (ttt), (uuu), (vvv), (www) and (xxx) if the demand for any cell was not fully satisfied but only after increasing the target reuse rate and reinitializing each target reuse rate counter for each channel in each sub-pool in pools P1 and P2 and in each channel in pool P3 with the increased value.

\* \* \* \* \*